United States Patent
Kim et al.

(10) Patent No.: US 8,929,274 B2
(45) Date of Patent: Jan. 6, 2015

(54) RELAY STATION AND METHOD OF RELAY STATION TRANSMITTING BACKHAUL UPLINK SIGNAL

(75) Inventors: Hak Seong Kim, Anyang-si (KR); Han Byul Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 13/390,029

(22) PCT Filed: Aug. 12, 2010

(86) PCT No.: PCT/KR2010/005311
§ 371 (c)(1),
(2), (4) Date: Feb. 10, 2012

(87) PCT Pub. No.: WO2011/019223
PCT Pub. Date: Feb. 17, 2011

(65) Prior Publication Data
US 2012/0140703 A1  Jun. 7, 2012

Related U.S. Application Data

(60) Provisional application No. 61/233,133, filed on Aug. 12, 2009, provisional application No. 61/267,085, filed on Dec. 7, 2009, provisional application No. 61/294,480, filed on Jan. 12, 2010, provisional application No. 61/296,475, filed on Jan. 19, 2010.

(51) Int. Cl.
| | |
|---|---|
| *H04W 72/04* | (2009.01) |
| *H04B 7/14* | (2006.01) |
| *H04L 5/00* | (2006.01) |
| *H04W 88/04* | (2009.01) |
| *H04L 1/16* | (2006.01) |

(52) U.S. Cl.
CPC ......... *H04L 5/0048* (2013.01); *H04W 72/0446* (2013.01); *H04L 5/0007* (2013.01); *H04W 88/04* (2013.01); *H04L 5/0053* (2013.01); *H04L 1/1692* (2013.01)
USPC .......................................................... 370/315

(58) Field of Classification Search
None
See application file for complete search history.

(56) References Cited

U.S. PATENT DOCUMENTS

| | | |
|---|---|---|
| 2008/0043710 A1 | 2/2008 | Zhou et al. |
| 2008/0081626 A1* | 4/2008 | Choi et al. .................... 455/442 |
| 2008/0107062 A1 | 5/2008 | Viorel et al. |
| 2008/0159217 A1* | 7/2008 | Chang et al. .................. 370/329 |
| 2008/0207193 A1 | 8/2008 | Oh et al. |

(Continued)

OTHER PUBLICATIONS

Motorola (Optimization of Resource Assignment for Uplink Backhaul; May 4-8, 2009, R1-092169).*

(Continued)

*Primary Examiner* — Hassan Kizou
*Assistant Examiner* — Tejis Daya
(74) *Attorney, Agent, or Firm* — Birch, Stewart, Kolasch & Birch, LLP

(57) ABSTRACT

A method of a relay station transmitting a backhaul uplink (UL) signal includes receiving information about a structure of a subframe from a base station; allocating a reference signal and control information to the backhaul UL subframe on a basis of the information; and transmitting the reference signal and the control information. The reference signal or the control information is allocated to symbols other than a first symbol and last 2 symbols of the backhaul UL subframe.

20 Claims, 27 Drawing Sheets

(56) References Cited

U.S. PATENT DOCUMENTS

| | | | |
|---|---|---|---|
| 2009/0067391 A1* | 3/2009 | Shen et al. | 370/336 |
| 2009/0238121 A1* | 9/2009 | Kotecha | 370/329 |
| 2010/0238845 A1* | 9/2010 | Love et al. | 370/280 |
| 2011/0299614 A1* | 12/2011 | Kim et al. | 375/260 |
| 2012/0002576 A1* | 1/2012 | Zhang et al. | 370/280 |
| 2012/0044857 A1* | 2/2012 | Kim et al. | 370/315 |
| 2012/0236798 A1* | 9/2012 | Raaf et al. | 370/328 |

OTHER PUBLICATIONS

Samsung (Guard period in UL backhaul subframes, Mar. 23-27, 2009, R1-091234).*

ZTE (Control Channel Structure and Mapping Pattern of Backhauil Link, Mar. 23-27, 2009, R1-091424).*

LG Electronics (Guard time handling in backhaul link design, Jul. 3, 2009, R1-092494).*

LG Electronics, Backhaul subframe structure considering guard time position, TSG-RAN WG1 Meeting #58, R1-093243, Aug. 24-28, 2009.*

ZTE, Subframe structure and timing offset for UL measurement, TSG-RAN WG1 #58, R1-093203, Aug. 24-28, 2009.*

LG Electronics, Resource Usage Optimization in Backhaul Design, TSG-RAN WG1 Meeting#59, R1-094480, Nov. 9-13, 2009.*

IEEE Std 802.16j-2009, "Part 16: Air Interface for Broadband Wireless Access Systems—Amendment 1: Multihop Relay Specification", Jun. 12, 2009, See 8.4.8.1.5.1; figure 263, New York.

* cited by examiner

RELAY STATION AND METHOD OF RELAY STATION TRANSMITTING BACKHAUL UPLINK SIGNAL

This application is the National Phase of PCT/KR2010/005311 filed on Aug. 12, 2010, which claims priority under 35 U.S.C. 119(e) to the U.S. Provisional Application Nos. 61/233,133 filed on Aug. 12, 2009, 61/267,085 filed on Dec. 7, 2009, 61/294,480 filed on Jan. 12, 2010, and 61/296,475 filed on Jan. 19, 2010, all of which are hereby expressly incorporated by reference into the present application.

TECHNICAL FIELD

The present invention relates to wireless communication, and more particularly, to a method of a relay station transmitting a backhaul UL signal in a wireless communication system and a relay station utilizing the method

BACKGROUND ART

In the ITU-R (International Telecommunication Union Radio communication sector), a standardization work for IMT (International Mobile Telecommunication)-Advanced (i.e., the next-generation mobile communication system after the third generation) is in progress. IMT-Advanced sets its goal to support IP (Internet Protocol)-based multimedia service at the data transfer rate of 1 Gbps in stop and slow-speed moving states and of 100 Mbps in a fast-speed moving state.

One of the powerful candidates as system standards to fulfill the requirements of IMT-Advanced is LTE-A (Long Term Evolution-Advanced) of 3GPP (3rd Generation Partnership Project). The LTE-A is an improved version of 3GPP LTE (hereinafter referred to as 'LTE'). The LTE is part of E-UMTS (Evolved-UMTS) using an E-UTRAN (Evolved-Universal Terrestrial Radio Access Network). The LTE adopts OFDMA (Orthogonal Frequency Division Multiple Access) in downlink and SC-FDMA (Single Carrier-Frequency Division Multiple Access) in uplink.

In the LTE-A, consideration is taken of a relay station to be included in a wireless communication system. The relay station functions to extend the cell coverage and improve transmission performance. A base station can have an advantage of extending the cell coverage by servicing user equipments, located in the cell coverage thereof, through relay stations. Further, since the relay stations improve transmission reliability between the base station and the user equipments, the transmission capacity can be increased. A relay station may be utilized in the case in which a user equipment is located in a shadow region although it is within the coverage of a base station.

A relay station commonly divides subframes into a reception subframe for receiving a signal from a user equipment connected thereto and a transmission subframe for transmitting a signal to a base station in order to prevent self-interference. Here, a guard time needs to be placed in the reception subframe or the transmission subframe of a signal. The guard time is used for stabilization and the prevention of interference according to the transmission/reception switching of a signal in a relay station. If the guard time is included in the transmission subframe, available time resources that the relay station can transmit a signal to the base station are reduced.

Further, during the time for which a relay station receives a signal from a user equipment connected to the relay station (hereinafter referred to as a 'R-UE'), it is difficult for the relay station to transmit a signal to a base station. In the case in which a signal transmitted by a R-UE is received in some of the transmission subframes of a relay station because of, for example, propagation delay, the relay station may not use some of the transmission subframes.

Meanwhile, in a wireless communication system environment, fading is generated because of multi-path time delay. A process of restoring a transmission signal by compensating for the distortion of a signal, occurring because of an abrupt change in the environment due to fading, is called channel estimation. In general, channel estimation is performed using a reference signal (RS) known to both a receiver and a transmitter. A relay station can also transmit the reference signal to a base station.

Further, a relay station may need to transmit control information such as channel information between a base station and the relay station, ACK/NACK (acknowledgement/not-acknowledgement), to a base station.

In the case in which a relay station transmits a reference signal or a backhaul UL signal, such as control information, to a base station, there is a need for a signal transmission method in which a reduction in available time resources in the backhaul uplink between a relay station and a base station due to a guard time or the reception of a signal from a R-UE is taken into consideration.

SUMMARY OF INVENTION

Technical Problem

Accordingly, the present invention has been made in view of the above problems, and it is an object of the present invention to provide a method of a relay station transmitting a backhaul UL signal in a wireless communication system and a relay station using the method.

Solution to Problem

According to an aspect of the present invention, there is provided a method of a relay station transmitting a backhaul uplink (UL) signal, comprising receiving information about a structure of a subframe from a base station; allocating a reference signal and control information to the backhaul UL subframe on the basis of the information; and transmitting the reference signal and the control information. The reference signal or the control information is allocated to symbols other than a first symbol and last 2 symbols of the backhaul UL subframe.

The backhaul UL subframe includes two slots, and each of the slots includes a plurality of symbols.

In the case in which each of the two slots includes 7 symbols and indices of the symbols are sequentially given 0 to 6, respectively, the reference signal is allocated to a symbol having the symbol index of 2, 3, or 4 in each of the two slots, and the control information is allocated to a symbol having the symbol index of 1, 5, or 6 in the first slot and a symbol having the symbol index of 0 or 1 in the second slot. In the case in which each of the two slots includes 6 symbols and indices of the symbols are sequentially given 0 to 5, respectively, the reference signal is allocated to a symbol having the symbol index of 2 or 3 in each of the two slots, and the control information is allocated to a symbol having the symbol index of 1, 4, or 5 in the first slot and a symbol having the symbol index of 0 or 1 in the second slot.

In the case in which each of the two slots includes 7 symbols and indices of the symbols are sequentially given 0 to 6, respectively, the reference signal is allocated to a symbol having the symbol index of 1 or 5 in the first slot and a symbol having the symbol index of 1 in the second slot, and the control information is allocated to a symbol having the symbol index of 2, 3, 4, or 6 in the first slot and a symbol having the symbol index of 0, 2, 3, or 4 in the second slot. In the case in which each of the two slots includes 6 symbols and indices of the symbols are sequentially given 0 to 5, respectively, the reference signal is allocated to a symbol having the symbol index of 3 in each of the two slots, and the control information is allocated to a symbol having the symbol index of 1, 2, 4, or 5 in the first slot and a symbol having the symbol index of 0, 1, or 2 in the second slot.

In the case in which each of the two slots includes 7 symbols and indices of the symbols are sequentially given 0 to 6, respectively, the reference signal is allocated to a symbol having the symbol index of 2, 3, or 4 in the first slot and a symbol having the symbol index of 2 or 3 in the second slot, and the control information is allocated to a symbol having the symbol index of 1, 5, or 6 in the first slot and a symbol having the symbol index of 1 or 4 in the second slot. In the case in which each of the two slots includes 6 symbols and indices of the symbols are sequentially given 0 to 5, respectively, the reference signal is allocated to a symbol having the symbol index of 2 or 3 in the first slot and a symbol having the symbol index of 2 in the second slot, and the control information is allocated to a symbol having the symbol index of 1, 4, or 5 in the first slot and a symbol having the symbol index of 0, 1, or 3 in the second slot.

In the case in which each of the two slots includes 7 symbols and indices of the symbols are sequentially given 0 to 6, respectively, the reference signal is allocated to a symbol having the symbol index of 1 or 5 in the first slot and a symbol having the symbol index of 1 or 3 in the second slot, and the control information is allocated to a symbol having the symbol index of 2, 3, 4, or 6 in the first slot and a symbol having the symbol index of 0, 2, or 4 in the second slot. In the case in which each of the two slots includes 6 symbols and indices of the symbols are sequentially given 0 to 5, respectively, the reference signal is allocated to a symbol having the symbol index of 3 in the first slot and a symbol having the symbol index of 2 in the second slot, and the control information is allocated to a symbol having the symbol index of 1, 2, 4, or 5 in the first slot and a symbol having the symbol index of 0, 1, or 3 in the second slot.

In the case in which each of the two slots includes 7 symbols and indices of the symbols are sequentially given 0 to 6, respectively, the reference signal is allocated to a symbol having the symbol index of 3 or 4 in the first slot and a symbol having the symbol index of 2 or 3 in the second slot, and the control information is allocated to a symbol having the symbol index of 1, 2, 5, or 6 in the first slot and a symbol having the symbol index of 0, 1, or 4 in the second slot. In the case in which each of the two slots includes 6 symbols and indices of the symbols are sequentially given 0 to 5, respectively, the reference signal is allocated to a symbol having the symbol index of 2 or 3 in each of the slots, and the control information is allocated to a symbol having the symbol index of 1, 4, or 5 in the first slot and a symbol having the symbol index of 0 or 1 in the second slot.

In the case in which each of the two slots includes 7 symbols and indices of the symbols are sequentially given 0 to 6, respectively, the reference signal is allocated to a symbol having the symbol index of 2 or 5 in the first slot and a symbol having the symbol index of 1 or 4 in the second slot, and the control information is allocated to a symbol having the symbol index of 1, 3, 4, or 6 in the first slot and a symbol having the symbol index of 0, 2, or 3 in the second slot. In the case in which each of the two slots includes 6 symbols and indices of the symbols are sequentially given 0 to 5, respectively, the reference signal is allocated to a symbol having the symbol index of 3 in the first slot and a symbol having the symbol index of 2 in the second slot, and the control information is allocated to a symbol having the symbol index of 1, 2, 4, or 5 in the first slot and a symbol having the symbol index of 0, 1, or 3 in the second slot.

The reference signal may be a demodulation reference signal.

According to another aspect of the present invention, there is provided a method of a relay station transmitting a backhaul UL signal, comprising receiving an access UL signal from a R-UE and transmitting the backhaul UL signal to a base station. The access UL signal or the backhaul UL signal are received or transmitted by a slot of a subframe.

The access UL signal is received in a first slot of the subframe, and the backhaul UL signal is transmitted in a second slot of the subframe.

The backhaul UL signal includes a sounding reference signal transmitted from the relay station to the base station.

The backhaul UL signal is transmitted in a first slot of the subframe, and the access UL signal is received in a second slot of the subframe.

The access UL signal includes a sounding reference signal transmitted from the R-UE to the relay station.

According to yet another aspect of the present invention, there is provided a relay station comprises a Radio Frequency (RF) unit configured to transmit and receive a radio signal and a processor connected to the RF unit. The processor receives information about a structure of a subframe from a base station, allocates a reference signal and control information to a backhaul UL subframe on the basis of the information, and transmits the reference signal and the control information to the base station, and the reference signal or the control information is allocated to symbols other than a first symbol and last two symbols of the backhaul UL subframe Advantageous Effects of Invention A relay station can transmit a backhaul UL signal through radio resources allocated thereto by taking the restrictions of available radio resources in the backhaul uplink into consideration.

MODE FOR THE INVENTION

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). The CDMA system can be implemented using radio technology, such as Universal Terrestrial Radio Access (UTRA) or CDMA2000. The TDMA system can be implemented using radio technology, such as Global System for Mobile communications (GSM), General Packet Radio Service (GPRS), or Enhanced Data Rates for GSM Evolution (EDGE). The OFDMA system can be implemented using radio technology, such as IEEE (Institute of Electrical and Electronics Engineers) 802.11 (Wi-Fi), IEEE 802.16 (WiMAX), IEEE 802-20, or Evolved UTRA (E-UTRA). IEEE 802.16m is the evolution of IEEE 802.16e, and it provides backward compatibility with an IEEE 802.16e-based system. UTRA is part of a Universal Mobile Telecommunications System (UMTS). 3$^{rd}$ Generation Partnership Project (3GPP) Long Term Evolution (LTE) is part of Evolved UTMS (E-UMTS) using Evolved-UMTS Terrestrial Radio Access (E-UTRA). The 3GPP LTE adopts OFDMA in the downlink and SC-FDMA in the uplink. LTE-A (Advanced) is the evolution of 3GPP LET. In order to clarify a description, LTE-A is chiefly described, but the technical feature of the present invention is not limited thereto.

Figure 1:
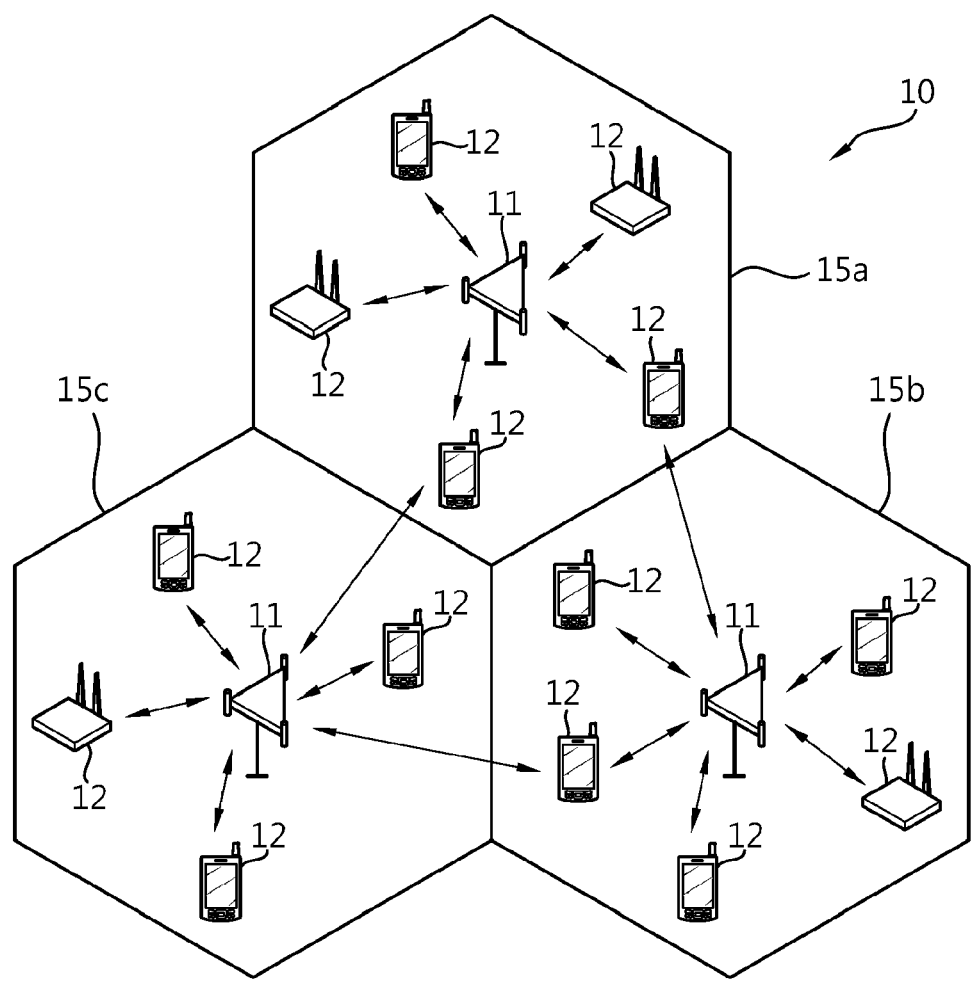
FIG. 1 is a diagram showing a wireless communication system.

FIG. 1 is a diagram showing a wireless communication system.

The wireless communication system 10 includes at least one Base Station (BS) 11. The base stations 11 provide communication services to respective geographical areas (in general, called 'cells') 15a, 15b, and 15c. The cell can be divided into a plurality of areas (called 'sectors'). A User Equipment (UE) 12 can be fixed and mobile and also referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. The base station 11 commonly refers to a fixed station which communicates with the user equipment 12, and it can also be referred to as another terminology, such as an evolved-NodeB (eNB), a Base Transceiver System (BTS), or an access point. Hereinafter, downlink refers to communication from the base station 11 to the user equipment 12, and uplink refers to communication from the user equipment 12 to the base station 11.

Figure 2:
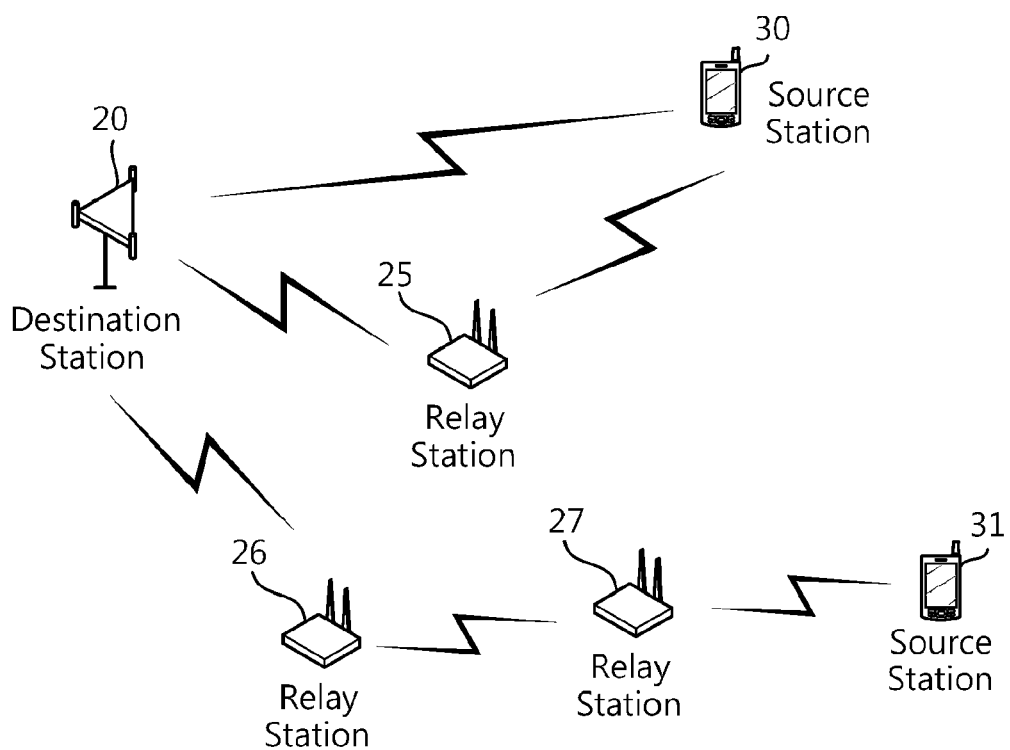
FIG. 2 is a diagram showing a wireless communication system using relay stations.

FIG. 2 is a diagram showing a wireless communication system using relay stations.

Referring to FIG. 2, a relay station 25 is deployed in the wireless communication system, and it can relay a signal between a source station 30 and a destination station 20. In uplink transmission, the source station 30 can be a user equipment, and the destination station 20 can be a base station. Relay stations 25, 26, and 27 may be additional relay station or user equipments. The source station 30 can transmit an uplink signal to the destination station 20 and the relay station 25, and the relay station 25 re-transmits the received uplink signal to the destination station 20. A plurality of the relay stations 26 and 27 may exist between the source station 30 and the destination station 20. In this case, the relay stations 26 and 27 can retransmit received uplink signals simultaneously or sequentially.

Any method, such as Amplify and Forward (AF) and Decode and Forward (DF), can be used as a relay method used in the relay stations 25, 26, and 27, but the technical feature of the present invention is not limited thereto.

Hereinafter, a link between a relay station and a base station is referred to as a backhaul link, and a link between a relay station and a R-UE is referred to as an access link. Communication from a relay station to a base station is referred to as backhaul uplink (hereinafter referred to as 'backhaul UL'), and communication from a base station to a relay station is referred to as backhaul downlink (hereinafter referred to as 'backhaul DL'). Communication from a R-UE to a relay station is referred to as access uplink (hereinafter referred to as 'access UL'), and communication from a relay station to a R-UE is referred to as access downlink (hereinafter referred to as 'access DL'). A user equipment directly communicating with a base station is referred to as a macro UE (hereinafter referred to as 'macro UE' or 'Ma-UE'), and a user equipment communicating with a relay station is referred to as a R-UE (hereinafter referred to as 'relay UE' or 'R-UE').

Figure 3:
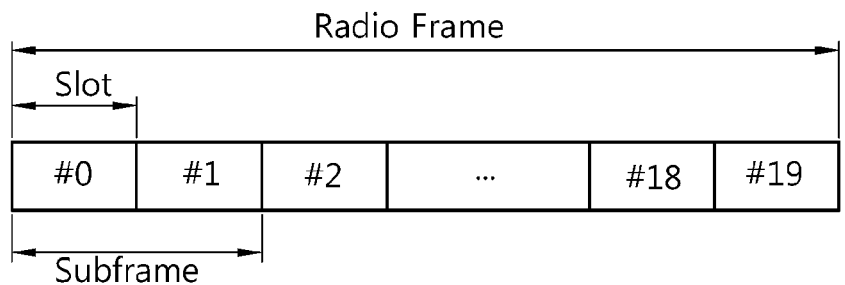
FIG. 3 is a diagram showing the structure of a radio frame in 3GPP LTE.

FIG. 3 is a diagram showing the structure of a radio frame in 3GPP LTE. For the structure, reference can be made to section 5 of 3GPP (3rd Generation Partnership Project) TS 36.211 V8.2.0 (2008-03) 'Technical Specification Group Radio Access Network; Evolved Universal Terrestrial Radio Access (E-UTRA); Physical channels and modulation (Release 8)'.

Referring to FIG. 3, the radio frame includes 10 subframes. One subframe includes two slots. The slots within the radio frame are assigned slot numbers or slot indices from #0 to #19. The time that it takes to transmit one subframe is referred to as a Transmission Time Interval (TTI). The TTI can be a scheduling unit for data transmission. For example, the length of one radio frame can be 10 ms, the length of one subframe can be 1 ms, and the length of one slot can be 0.5 ms.

Figure 4:
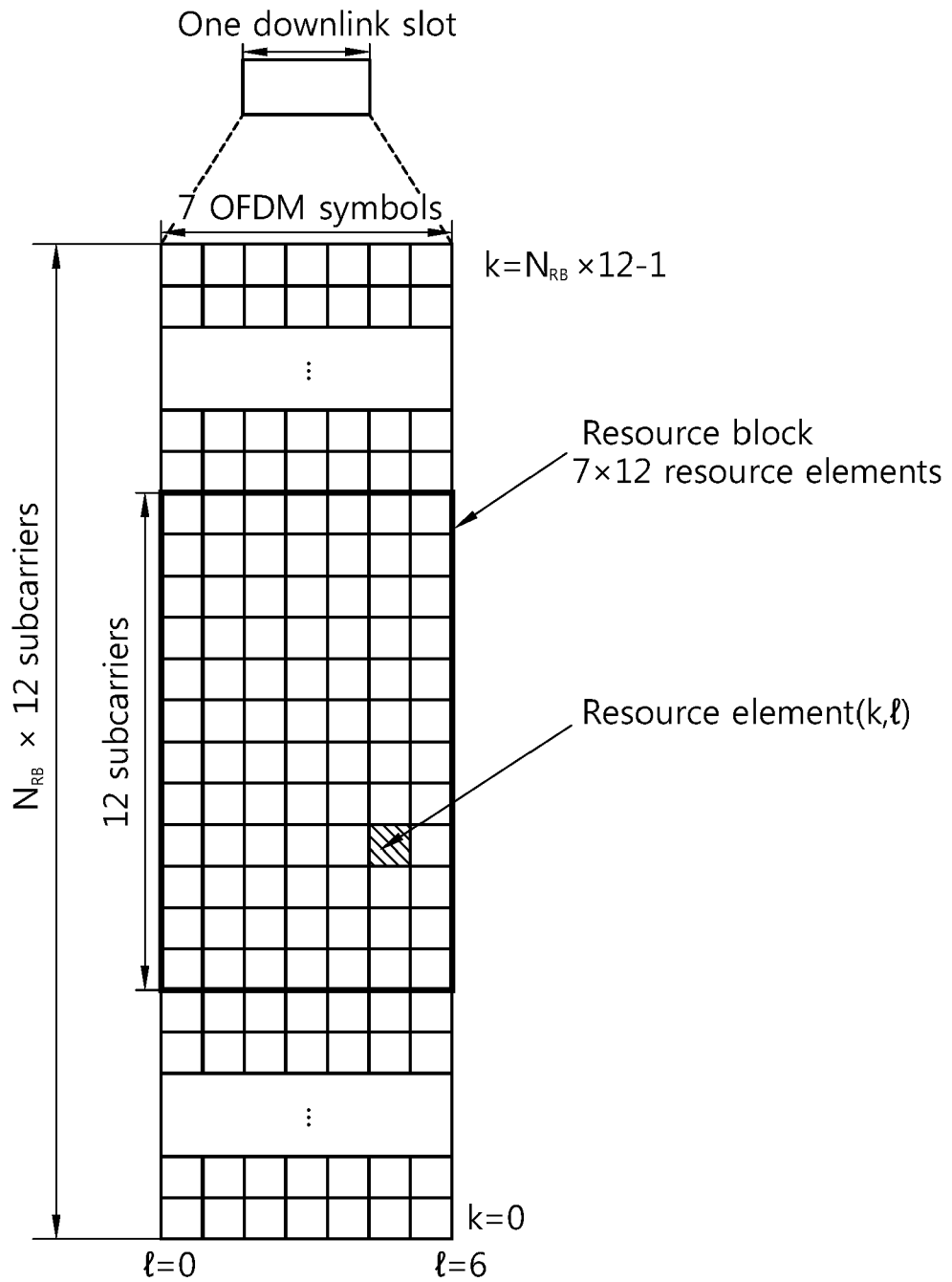
FIG. 4 is a diagram showing an example of a resource grid for one downlink slot.

FIG. 4 is a diagram showing an example of a resource grid for one downlink slot.

The downlink slot includes a plurality of OFDM symbols in the time domain and an $N_{RB}$ number of Resource Blocks (RBs) in the frequency domain. The OFDM symbol is used to represent one symbol period because OFDMA is used by 3GPP LTE in the downlink. The OFDM symbol may be referred to as another terminology, such as an SC-FDMA symbol. The number of resource blocks $N_{RB}$ included in a downlink slot depends on a downlink transmission bandwidth set in a cell. For example, in an LTE system, the number of resource blocks $N_{RB}$ can be any one of 60 to 110. One resource block includes a plurality of subcarriers in the frequency domain.

Each element on the resource grid is referred to as a resource element (hereinafter referred to as ' '). The RE on the resource grid can be identified by an index pair (k,l) within a slot. Here, k (where k=0, . . . , $N_{RB}$×12−1) is a subcarrier index within the frequency domain, and l (where l=0, . . . , 6) is an OFDM symbol index within the time domain.

It is hereinafter illustrated that one resource block includes 7 OFDM symbols in the time domain and 12 subcarrier in the frequency domain, resulting in 7×12 REs. However, the number of OFDM symbols and the number of subcarriers within a resource block are not limited thereto. The number of OFDM symbols and the number of subcarriers can be changed in various ways according to the length of a Cyclic Prefix (CP), frequency spacing, etc. Further, an uplink slot can have the same structure as the downlink slot.

Figure 5:
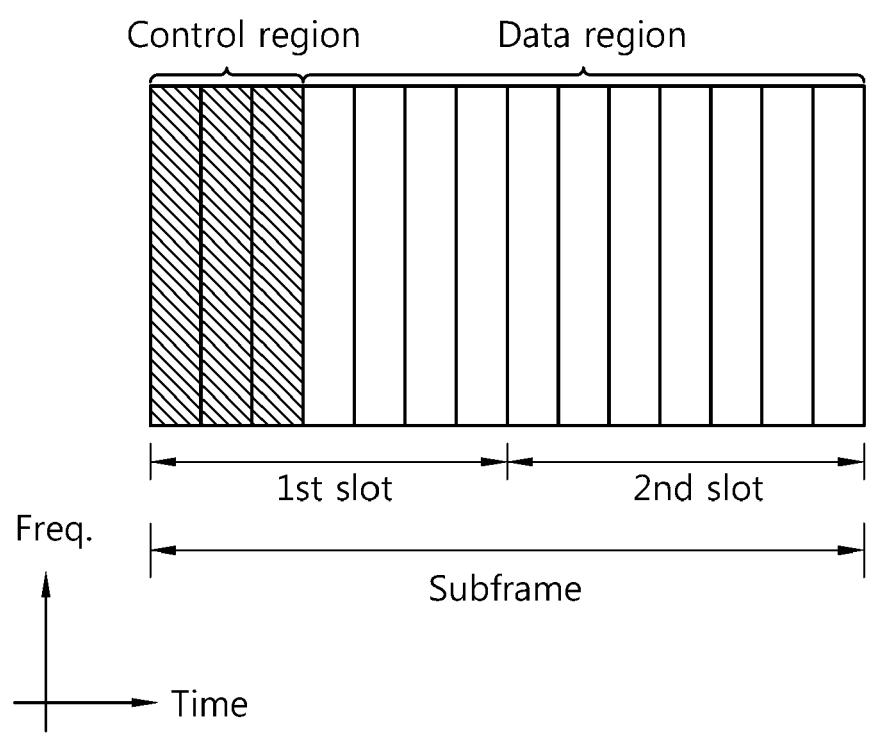
FIG. 5 is a diagram showing the structure of a downlink subframe.

FIG. 5 is a diagram showing the structure of a downlink subframe.

The downlink subframe includes 2 slots in the time domain. Each of the slots includes 7 OFDM symbols in a normal CP. A maximum of first 3 OFDM symbols of the first slot within the subframe correspond to a control region to which control channels are allocated, and the remaining OFDM symbols correspond to a data region to which Physical Downlink Shared Channels (PDSCHs) are allocated. Downlink control channels used in 3GPP LTE include a Physical Control Format Indicator Channel (PCFICH), a Physical Downlink Control Channel (PDCCH), a Physical Hybrid-ARQ Indicator Channel (PHICH), and so on. The PCFICH transmitted in the first OFDM symbol of a subframe carries information about the number of OFDM symbols (i.e., the size of a control region) which is used to transmit control channels within a subframe. The PHICH carries an ACK/NACK signal for an uplink Hybrid Automatic Repeat Request (HARM). That is, an ACK/NACK signal, transmitted by a base station in response to uplink data transmitted by a user equipment, is transmitted on the PHICH. Control information transmitted through the PDCCH is also referred to as downlink control information (hereinafter referred to as 'DCI'). The DCI indicates uplink or downlink scheduling information and an uplink transmission power control command for certain UE groups.

Figure 6:
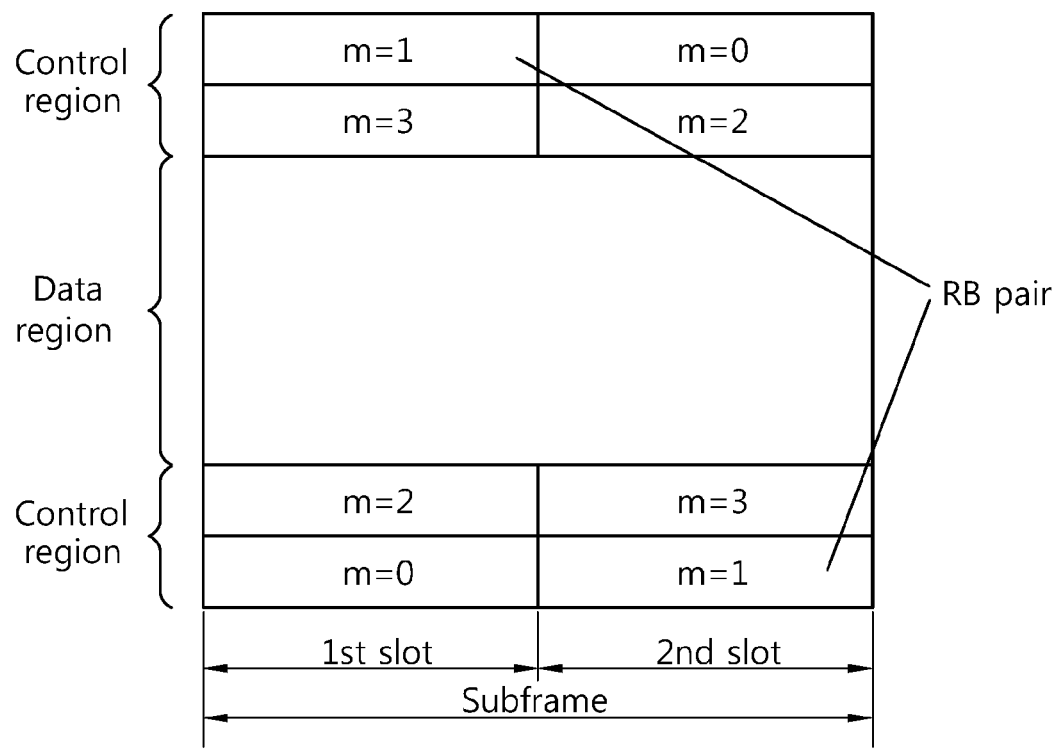
FIG. 6 is a diagram showing the structure of an uplink subframe.
Figure 6:
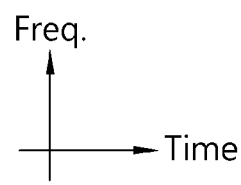

FIG. 6 is a diagram showing the structure of an uplink subframe.

The uplink subframe can be divided into a control region and a data region in the frequency domain. A Physical Uplink Control Channel (PUCCH) for transmitting uplink control information is allocated to the control region.

The PUCCH can support a multi-format. That is, the PUCCH can be used to transmit uplink control information having different numbers of bits per subframe according to a modulation scheme. For example, in the case in which BPSK (Binary Phase Shift Keying) is used (i.e., PUCCH format 1a), the uplink control information of 1 bit can be transmitted on the PUCCH. In the case in which QPSK (Quadrature Phase Shift Keying) is used (i.e., PUCCH format 1b), the uplink control information of 2 bits can be transmitted on the PUCCH. The PUCCH format can include format 1, format 2, format 2a, format 2b, and so on (see section 5.4 of 3GPP TS 36.211 V8.2.0 (2008-03) 'Technical Specification Group Radio Access Network; Evolved Universal Terrestrial Radio Access (E-UTRA); Physical Channels and Modulation (Release 8)').

The PUCCH for one user equipment is allocated to an RB pair in a subframe. RBs included in the RB pair occupy different subcarriers of each slot. It is called that the RB pair allocated to the PUCCH is frequency-hopped in a slot boundary.

A PUSCH (Physical Uplink Shared Channel) for transmitting data is allocated to the data region. In 3GPP LTE, in order to maintain a single carrier property, one UE does not transmit the PUCCH and the PUSCH at the same time.

The above uplink subframe structure is applied between a base station and a user equipment. However, if the uplink subframe structure is applied to backhaul UL in the same manner, a problem can arise. A relay station receives a signal from a relay UE and transmits it to the base station. That is, the relay station performs switching for the transmission and reception of the signals in the backhaul link and the access link. Here, a frequency band used by the relay station in order to receive a signal from the relay UE can be the same as a frequency band used by the relay station in order to transmit a signal to the base station. A relay station cannot perform the transmission and reception of signals at the same time in the same frequency band because of self-interference. Accordingly, a relay station needs to distinguish a subframe used to receive a signal from a relay UE and a subframe used to transmit a signal to a base station. And a guard time is placed for operational stabilization switching when the transmission and reception of signals are performed In the backhaul link and the access link. It is assumed that a relay station is unable to transmit or receive a signal in the guard time.

The guard time can be set to the time of 1 symbol or less. For example, a ½ symbol, a 1 symbol or the like can be set as the guard time. In the case in which a relay station transmits a signal to a base station, the above guard time has to be taken into consideration in the structure of a backhaul UL subframe. That is, how resource allocation will be made is problematic in the backhaul UL subframe in which the number of available symbols is reduced because of the guard time. In other words, the structure of the backhaul UL subframe is problematic.

Further, resource allocation for a reference signal (RS) also becomes problematic within a backhaul UL subframe. The reference signal is used in channel estimation. The channel estimation is necessary for user scheduling or data demodulation or both. Further, the reference signal can be used to measure a channel quality for a cell belonging to it or other cells, in addition to channel estimation. The reference signal is known to both a transmitter and a receiver and also called a pilot.

The reference signal includes two kinds; a demodulation reference signal (DM-RS) and a Sounding Reference Signal (hereinafter referred to as an 'SRS'). The DM-RS is a reference signal used in channel estimation for the demodulation of a received signal. The DM-RS can be called a dedicated reference signal or a user-specific reference signal or the like. The DM-RS is a reference signal related to a PUSCH or a PUCCH. The SRS is a reference signal which is transmitted from a user equipment to a base station for uplink scheduling. A base station estimates an uplink channel through a received SRS and uses the estimated uplink channel in uplink scheduling.

In a method of a relay station transmitting a backhaul UL signal according to an embodiment of the present invention, the relay station receives information about the structure of a backhaul UL subframe from a base station and allocates a reference signal and control information to the backhaul UL subframe on the basis of the information. The information about the structure of the backhaul UL subframe can include information about according to which structure (i.e., format) will be the control information allocated in the backhaul uplink and then transmitted (i.e., information about a control channel transmission format). The information about the structure of the backhaul UL subframe may be included in the control channel of a physical layer in which the information is transmitted from a base station to a relay station and then transmitted or may be transmitted through a higher layer signal, such as an RRC (radio resource control) message.

The structure of a backhaul UL subframe in which a signal is transmitted from a relay station to a base station is described below. Furthermore, a PUCCH and a PUSCH indicate a control channel and a data channel, respectively, which are transmitted from a macro UE to a base station. A relay-PUCCH (R-PUCCH) denotes a control channel which is transmitted from a relay station to a base station. A relay-PUSCH (R-PUSCH) indicates a data channel which is transmitted from a relay station to a base station. In the following drawings, regions on the drawings in which PUCCHs, PUSCHs, R-PUCCHs, and R-PUSCHs are shown indicate radio resource regions in which corresponding channels can be transmitted. A normal CP is described as an example, for convenience sake, but the present invention can also be applied to an extended CP.

Figure 7:
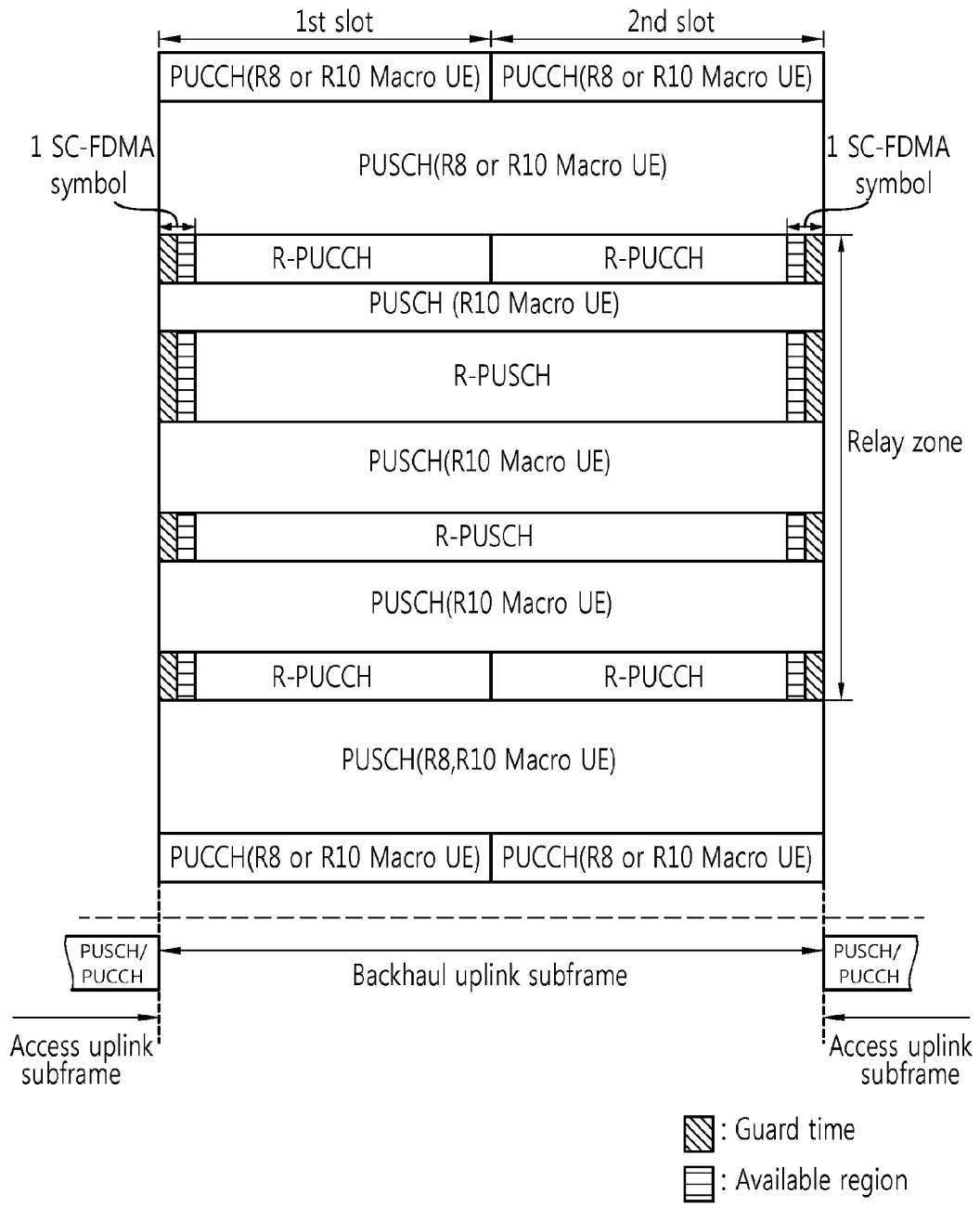
FIG. 7 is a diagram showing a first example of a backhaul UL (uplink) subframe structure.

FIG. 7 is a diagram showing a first example of a backhaul UL (uplink) subframe structure.

Referring to FIG. 7, a frequency band indicated by a relay zone in the frequency domain of a backhaul UL subframe is a frequency band allocated to a relay station. The relay zone can be all or part of a system band.

In the relay zone, a guard time is disposed in the first SC-FDMA symbol (hereinafter referred to as 'symbol', for convenience sake) and the last symbol. As described above, the guard time is the time that a relay station takes to switch transmission and reception. The number of symbols which can be used by a relay station in the relay zone is reduced because of the guard time, as compared with a user equipment.

A base station can multiplex PUSCHs in the relay zone, in addition to R-PUCCHs and R-PUSCHs. For example, in the case in which a resource block not allocated to a relay station exists in the relay zone, a base station can allocate the corresponding resource block to PUSCHs to be transmitted by a user equipment. In this case, it is preferred that the base station allocate PUSCHs within the relay zone to only a user equipment driven by LTE release-10. A user equipment driven by the existing LTE release-8 can transmit an SRS in the last symbol of a subframe and thus a relay station may be difficult to transmit the SRS.

Some of symbols including a guard time (i.e., some of symbols in the first symbol and the last symbol of a subframe) can be used. In FIG. 7, some of the symbols are indicated by an available region. The available region can be used to transmit data of a relay station and control information.

Figure 8:
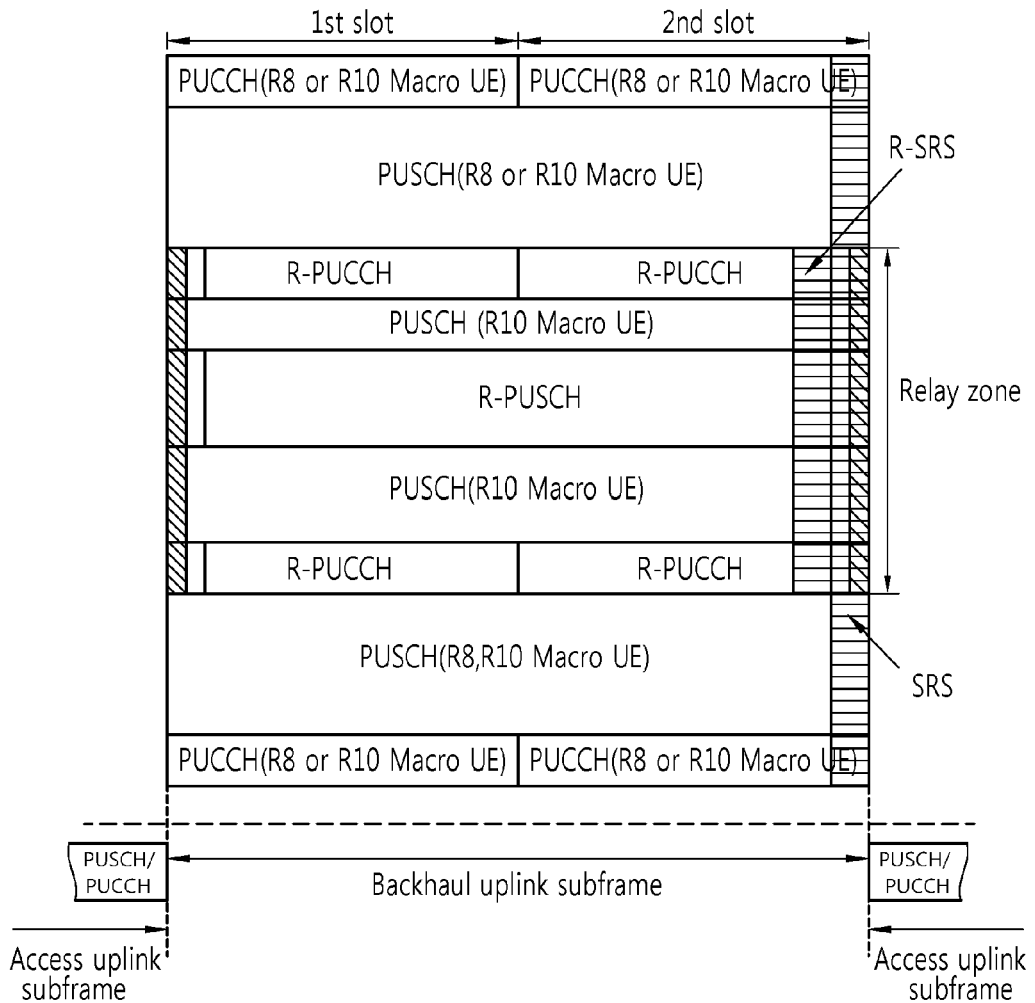
FIG. 8 is a diagram showing a second example of a backhaul UL subframe structure.

FIG. 8 is a diagram showing a second example of a backhaul UL subframe structure.

FIG. 8 shows a subframe structure which can be applied to a case in which a relay station transmits an SRS. An SRS transmitted by a relay station is hereinafter referred to as an R-SRS, for convenience sake.

A relay station can transmit an R-SRS to a base station through a different symbol from an SRS transmitted by a macro UE in the time domain. For example, a relay station can transmit an R-SRS in the second-to-last symbol of a second slot (i.e., the symbol #5 of the second slot). In this case, interference can be minimized and the multiplexing capability of an SRS between users is not deteriorated because the R-SRS does not overlap with an SRS transmitted by a macro UE. A relay station can transmit an R-SRS to a base station only in the relay zone in the frequency domain. Here, an SRS can be transmitted in a band in which PUCCH and PUSCH are transmitted and can be transmitted in a relay zone. A base station has only to receive an SRS in the last symbol of a subframe and perform channel estimation as in the prior art, for a macro UE, and has only to receive an R-SRS in the second-to-last symbol of a subframe and perform channel estimation, for a relay station.

In the case in which a PUSCH is allocated to a user equipment within a relay zone, the user equipment should not transmit data in a symbol in which an R-SRS is transmitted. In the case in which both an R-SRS and an SRS are transmitted, a user equipment should not transmit data in both symbols in which the R-SRS and the SRS are transmitted. A user equipment can need a new transmission format. For the user equipment, a new type of rate matching, coding, and interleaving can be designated.

Figure 9:
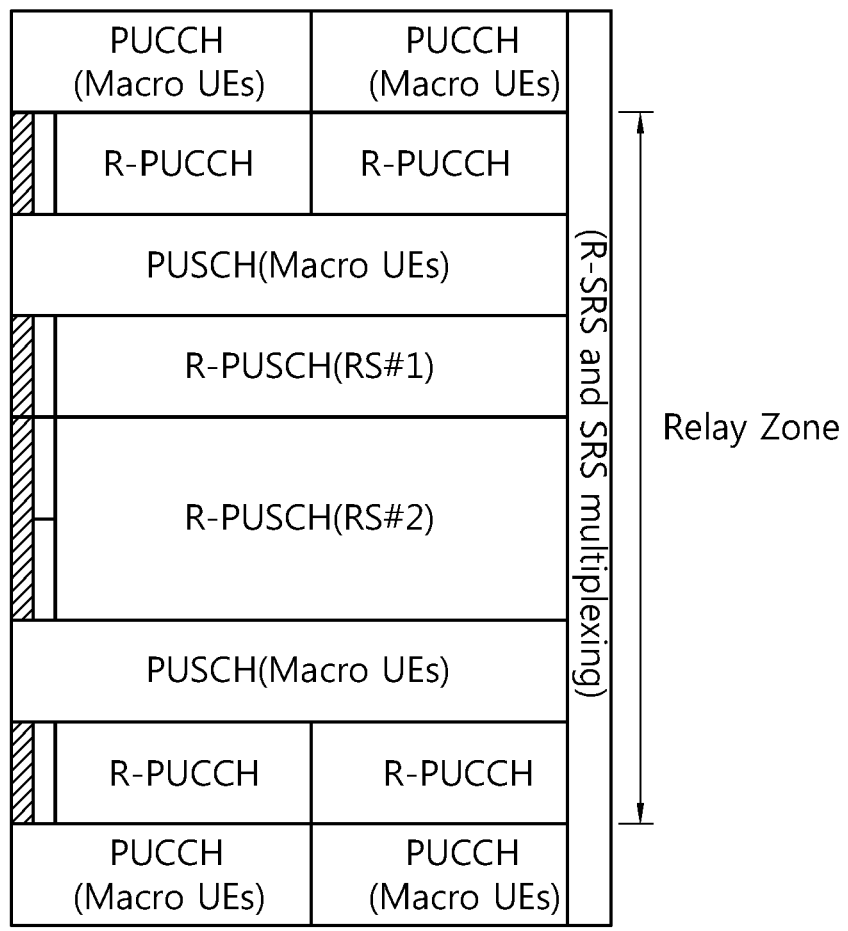
FIG. 9 is a diagram showing a third example of a backhaul UL subframe structure.
Figure 10:
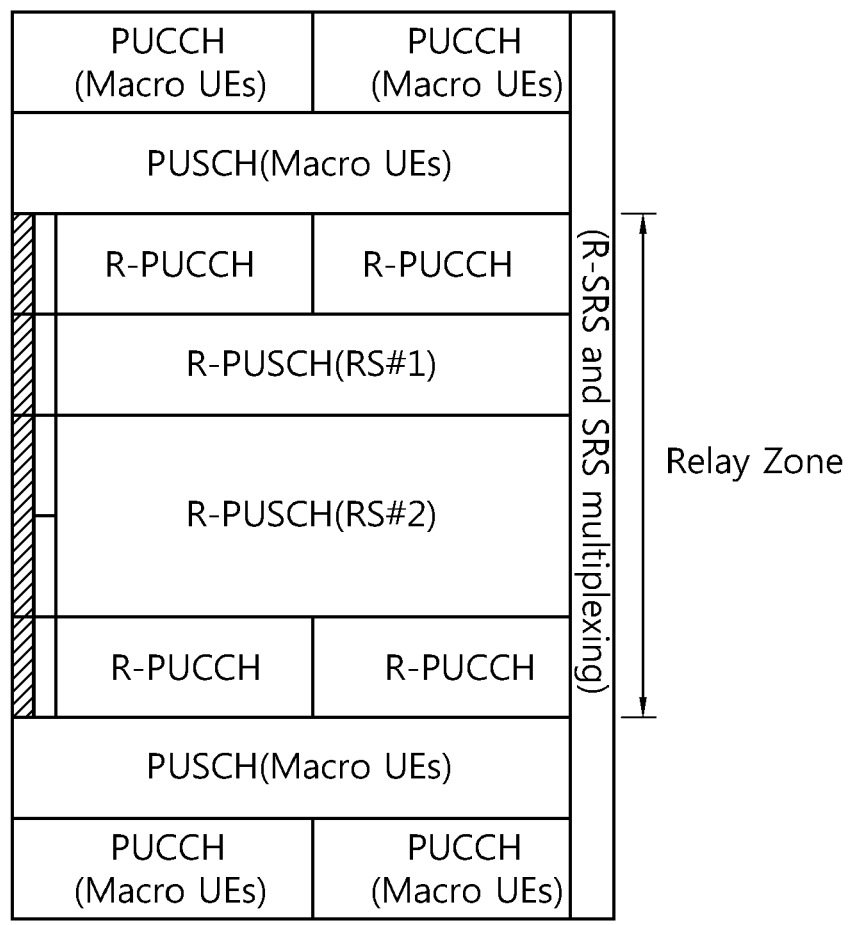
FIG. 10 is a diagram showing a fourth example of a backhaul UL subframe structure.

FIG. 9 is a diagram showing a third example of a backhaul UL subframe structure, and FIG. 10 is a diagram showing a fourth example of a backhaul UL subframe structure.

Referring to FIG. 9, a relay zone is allocated between zones in which PUCCHs are transmitted. PUSCHs can be allocated within the relay zone, in addition to R-PUCCHs and R-PUSCHs. Referring to FIG. 10, the relay zone is allocated between zones in which PUCCHs and PUSCHs are transmitted. R-PUCCH and R-PUSCH are allocated within the relay zone, but PUSCH is not allocated within the relay zone.

In FIGS. 9 and 10, an R-SRS can be transmitted in the same symbol as an SRS. That is, in the last symbol of a subframe, the R-SRS and the SRS can be multiplexed and transmitted. For example, the R-SRS and the SRS can be allocated to different sub-carriers and transmitted. The R-SRS can be mapped to an odd-numbered subcarrier and transmitted, and the SRS can be mapped to an even-numbered subcarrier and transmitted (and vice versa). Further, the R-SRS and the SRS may be multiplexed using an FDM scheme in which they are transmitted in different frequency bands or a CDM scheme in which different codes are applied.

In the case in which the backhaul UL subframe structures of FIGS. 8 to 10 are used, an R-PUSCH can be transmitted simultaneously with an R-PUCCH. If the degree of non-linear distortion of a relay station amplifier is low, the R-PUCCH and the R-PUSCH can be transmitted at the same time. However, if power of a relay station is limited or signal distortion resulting from an amplifier is great, it is preferred that the R-PUCCH and the R-PUSCH be separately transmitted.

Hereinafter, the structure of an R-PUCCH which can be applied in a backhaul UL subframe is described. As described above, since the guard time is included in the backhaul UL subframe, the number of symbols that can be used by a relay station in order to transmit a signal is reduced. Further, in a symbol used to receive an access UL signal transmitted by a relay UE, a relay station is difficult to transmit a backhaul UL signal to a base station. In the case in which an access UL signal is received in some of symbols of a subframe used to transmit a backhaul UL signal because of propagation delay, the number of symbols which can be used by a relay station is decreased.

For the above reasons, there is a need for a new control channel transmission format (i.e., the structure of an R-PUCCH) which can be used by a relay station.

Figure 11:
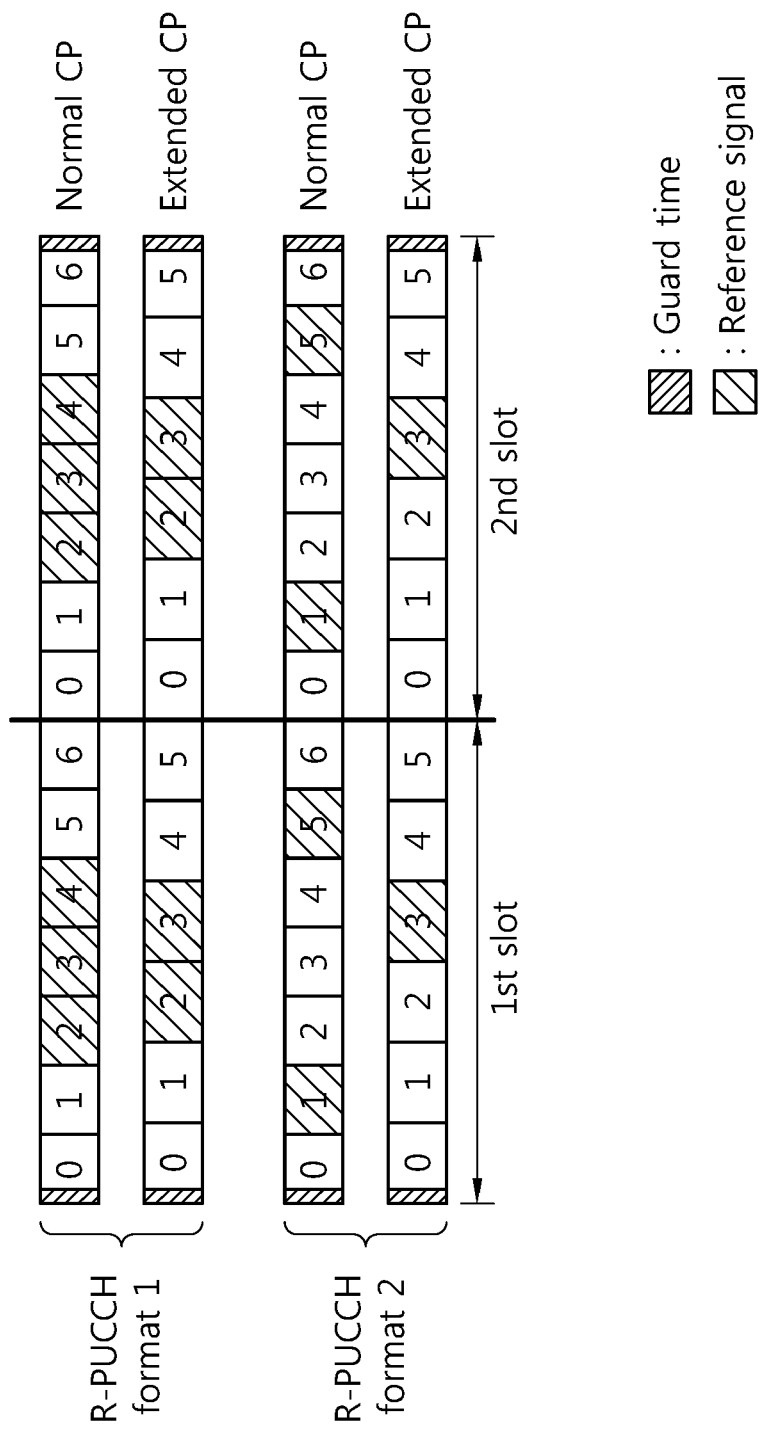
FIG. 11 is a diagram showing a first example of an R-PUCCH structure.

FIG. 11 is a diagram showing a first example of the R-PUCCH structure.

Referring to FIG. 11, in an R-PUCCH format 1, control information or a reference signal (DM-RS) is allocated to symbols other than the first symbol of a first slot and the last symbol of a second slot. If the indices of the symbols in each slot are sequentially given 0 to 6, in the case of a normal CP, the reference signal is allocated to the symbol #2, 3, or 4 of the first slot, and the control information is allocated to the symbol #1, 5, or 6 thereof. Further, the reference signal is allocated to the symbol #2, 3, or 4 of the second slot, and the control information is allocated to the symbol #0, 1, or 5 thereof. In the case of an extended CP, the reference signal is allocated to the symbol #2 or 3 of the first slot, and the control information is allocated to the symbol #1, 4, or 5 thereof. Further, the reference signal is allocated to the symbol #2 or 3 of the second slot, and the control information is allocated to the symbol #0, 1, or 4 thereof. A relay station can use the R-PUCCH format 1 to transmit an ACK/NACK signal.

In an R-PUCCH format 2, control information or a reference signal is allocated to symbols other than the first symbol of a first slot and the last symbol of a second slot. In the case of a normal CP, the reference signal is allocated to the symbol #1 or 5 of the first slot, and the control information is allocated to the symbol #2, 3, 4, or 6 thereof. Further, the reference signal is allocated to the symbol #1 or 5 of the second slot, and the control information is allocated to the symbol #0, 2, 3, or 4 thereof. In the case of an extended CP, the reference signal is allocated to the symbol #3 of the first slot, and the control information is allocated to the symbol #1, 2, 4, or 5 thereof. Further, the reference signal is allocated to the symbol #3 of the second slot, and the control information is allocated to the symbol #0, 1, 2, or 4 thereof. A relay station can use the R-PUCCH format 2 to transmit a CQI and an RI. The above R-PUCCH format 1 or 2 can be used in a subframe in which a relay station does not transmit an R-SRS.

Figure 12:
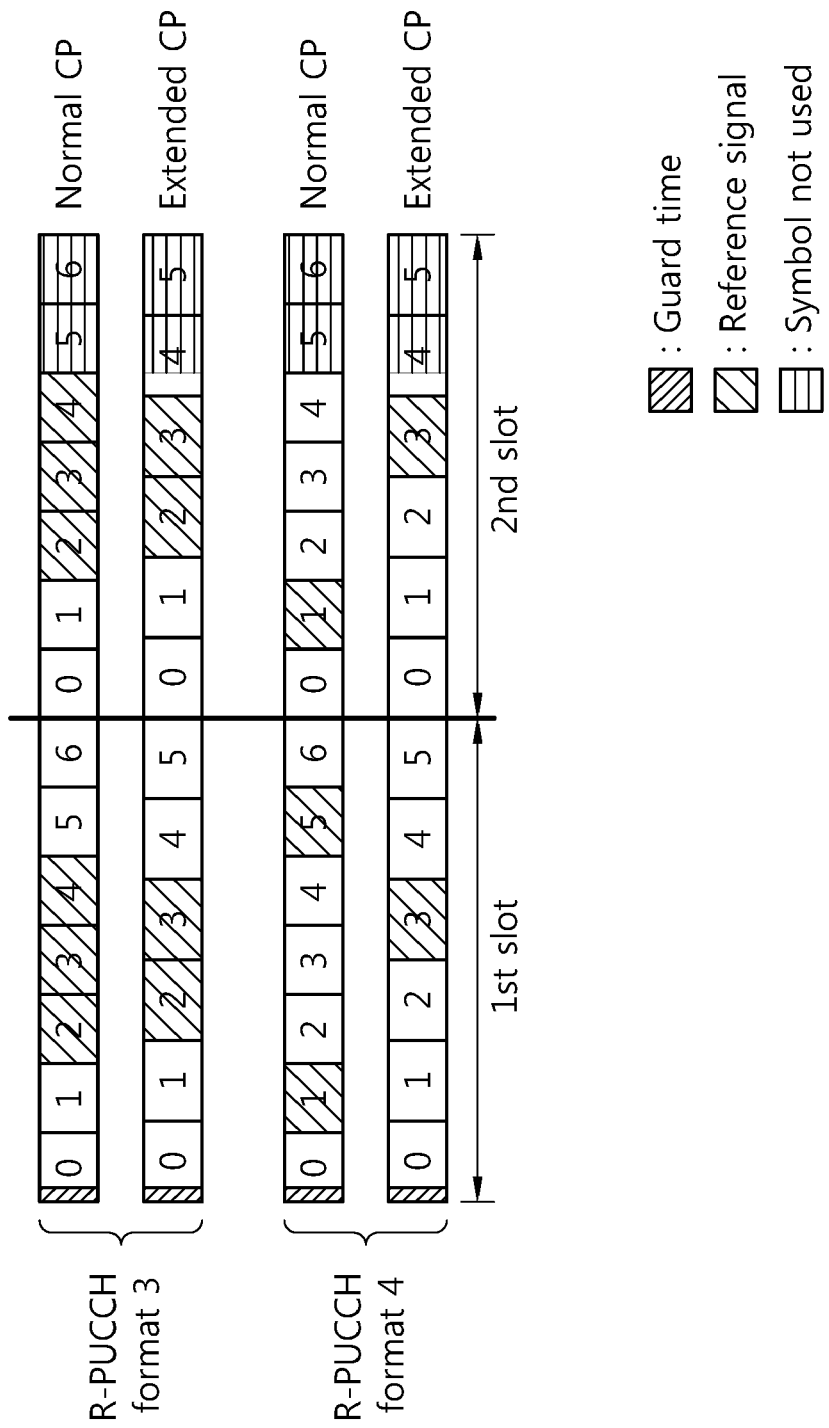
FIG. 12 is a diagram showing a second example of an R-PUCCH structure.

FIG. 12 is a diagram showing a second example of an R-PUCCH structure.

Referring to FIG. 12, in R-PUCCH formats 3 and 4, control information or a reference signal is allocated to symbols other than the first symbol of a subframe in which guard time is disposed and the last two symbols of a second slot. In the R-PUCCH format 3, in the case of a normal CP, the reference signal is allocated to the symbol #2, 3, or 4 of a first slot, and the control information is allocated to the symbol #1, 5, or 6 thereof. Further, the reference signal is allocated to the symbol #2, 3, or 4 of the second slot, and the control information is allocated to the symbol #0 or 1 thereof. In the case of an extended CP, the reference signal is allocated to the symbol #2 or 3 of the first slot, and the control information is allocated to the symbol #1, 4, or 5 thereof. Further, the reference signal is allocated to the symbol #2 or 3 of the second slot, and the control information is allocated to the symbol #0 or 1 thereof. A relay station can use the R-PUCCH format 3 to transmit an ACK/NACK signal.

In the R-PUCCH format 4, in the case of a normal CP, the reference signal is allocated to the symbol #1 or 5 of the first slot, and the control information is allocated to the symbol #2, 3, 4, or 6 thereof. Further, the reference signal is allocated to the symbol #1 of the second slot, and the control information is allocated to the symbol #0, 2, 3, or 4 thereof. In the case of an extended CP, the reference signal is allocated to the symbol #3 of the first slot, and the control information is allocated to the symbol #1, 2, 4, or 5 thereof. Further, the reference signal is allocated to the symbol #3 of the second slot, and the control information is allocated to the symbol #0, 1, or 2 thereof. A relay station can use the R-PUCCH format 4 to transmit a CQI and an RI.

Figure 13:
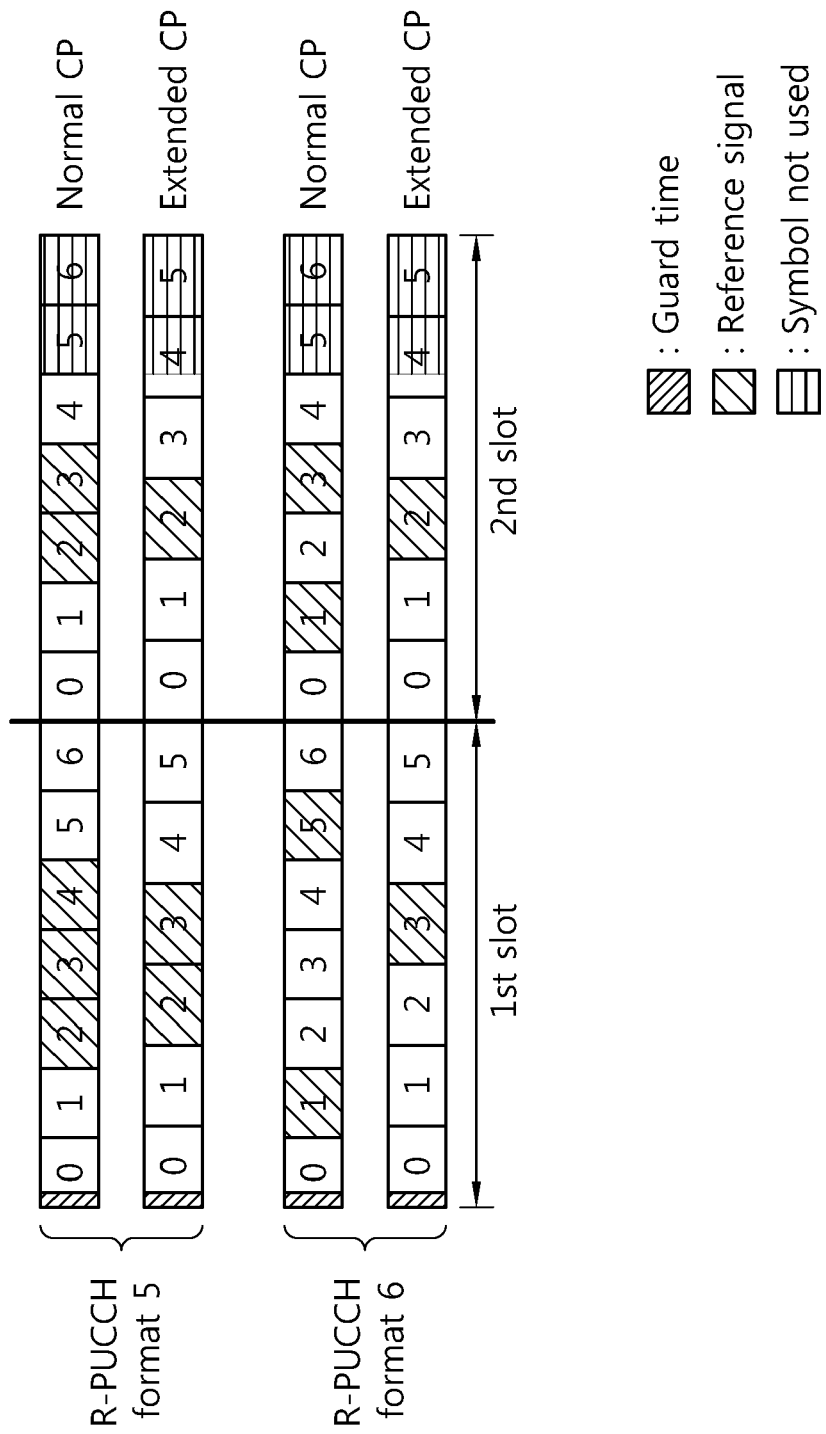
FIG. 13 is a diagram showing a third example of an R-PUCCH structure.

FIG. 13 is a diagram showing a third example of an R-PUCCH structure.

Referring to FIG. 13, in R-PUCCH formats 5 and 6, control information or a reference signal is allocated to symbols other than the first symbol of a subframe in which guard time is disposed and the last two symbols of a second slot. The R-PUCCH formats 5 and 6 differ from the R-PUCCH formats 3 and 4 in a method of allocating the reference signal and the control information in the second slot.

In the R-PUCCH format 5, in the case of a normal CP, the reference signal is allocated to the symbol #2, 3, or 4 of a first slot, and the control information is allocated to the symbol #1, 5, or 6 thereof. Further, the reference signal is allocated to the symbol #2 or 3 of the second slot, and the control information is allocated to the symbol #0, 1, or 4 thereof. In the case of an extended CP, the reference signal is allocated to the symbol #2 or 3 the first slot, and the control information is allocated to the symbol #1, 4, or 5 thereof. Further, the reference signal is allocated to the symbol #2 of the second slot, and the control information is allocated to the symbol #0, 1, or 3 thereof. A relay station can use the R-PUCCH format 5 to transmit an ACK/NACK signal. The R-PUCCH format 5 has a structure in which the number of symbols to which the reference signal is allocated in the second slot is small, as compared with the R-PUCCH format 3.

In the R-PUCCH format 6, in the case of a normal CP, the reference signal is allocated to the symbol #1 or 5 of the first slot, and the control information is allocated to the symbol #2, 3, 4, or 6 thereof. Further, the reference signal is allocated to the symbol #1 or 3 of the second slot, and the control information is allocated to the symbol #0, 2, or 4 thereof. In the case of an extended CP, the reference signal is allocated to the symbol #3 of the first slot, and the control information is allocated to the symbol #1, 2, 4, or 5 thereof. Further, the reference signal is allocated to the symbol #2 of the second slot, and the control information is allocated to the symbol #0, 1, or 3 thereof. A relay station can use the R-PUCCH format 6 to transmit a CQI and an RI.

Figure 14:
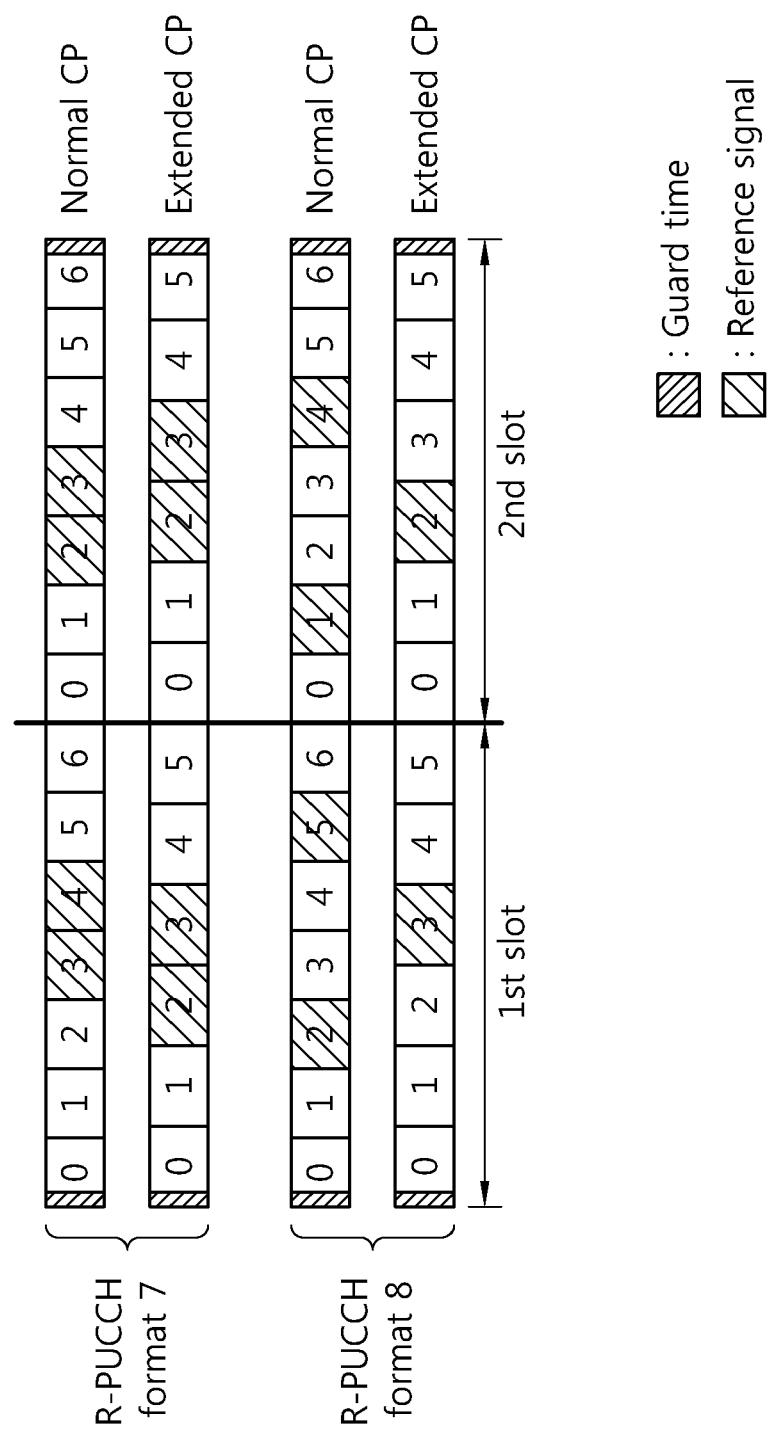
FIG. 14 is a diagram showing a fourth example of an R-PUCCH structure.

FIG. 14 is a diagram showing a fourth example of an R-PUCCH structure.

Referring to FIG. 14, in an R-PUCCH format 7, in the case of a normal CP, a reference signal is allocated to the symbol #3 or 4 of a first slot, and control information is allocated to the symbol #1, 2, 5, or 6 thereof. Further, the reference signal is allocated to the symbol #2 or 3 of a second slot, and the control information is allocated to the symbol #0, 1, 4, or 5 thereof. In the case of an extended CP, the reference signal is allocated to the symbol #2 or 3 of the first slot, and the control information is allocated to the symbol #1, 4, or 5 thereof. Further, the reference signal is allocated to the symbol #2 or 3 of the second slot, and the control information is allocated to the symbol #0, 1, or 4 thereof.

In an R-PUCCH format 8, in the case of a normal CP, the reference signal is allocated to the symbol #2 or 5 of the first slot, and the control information is allocated to the symbol #1, 3, 4, or 6 thereof. Further, the reference signal is allocated to the symbol #1 or 4 of the second slot, and the control information is allocated to the symbol #0, 2, 3, or 5 thereof. In the case of an extended CP, the reference signal is allocated to the symbol #3 of the first slot, and the control information is allocated to the symbol #1, 2, 4, or 5 thereof. Further, the reference signal is allocated to the symbol #2 of the second slot, and the control information is allocated to the symbol #0, 1, 3, or 4 thereof.

The fourth example of the R-PUCCH structure has a symmetrical structure around a slot boundary. Accordingly, a sequence applied to each symbol can also be constructed to have a symmetrical structure and used.

Figure 15:
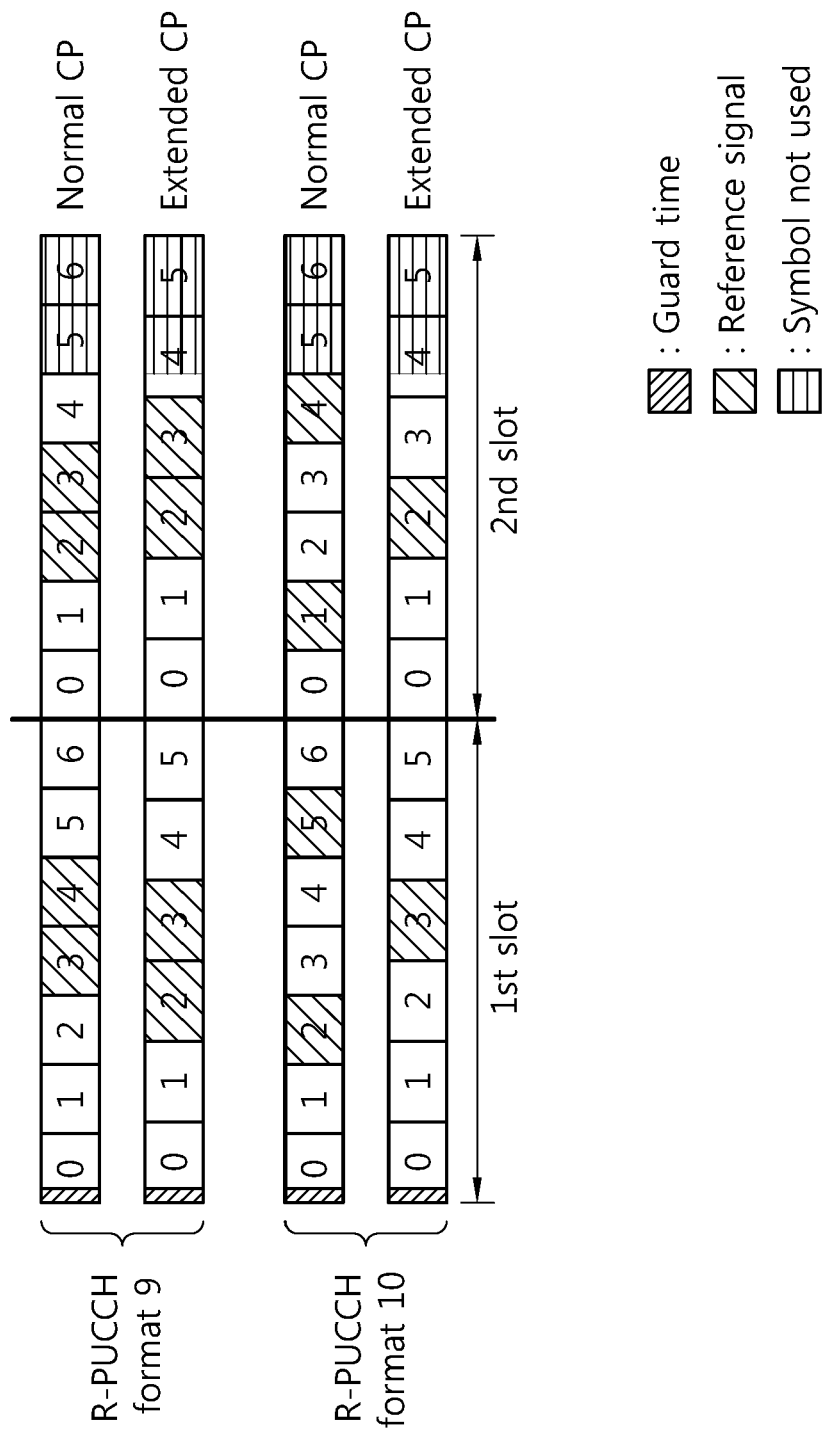
FIG. 15 is a diagram showing a fifth example of an R-PUCCH structure.

FIG. 15 is a diagram showing a fifth example of an R-PUCCH structure.

Referring to FIG. 15, in R-PUCCH formats 9 and 10, control information or a reference signal is allocated to symbols other than the first symbol of a subframe in which guard time is disposed and the last two symbols of a second slot. The fifth example of the R-PUCCH structure is the same as the fourth example of the R-PUCCH structure in symbols to which the reference signal is allocated, but differs from the fourth example of the R-PUCCH structure in symbols to which the control information is allocated. That is, the control information is not allocated to the last two symbols of the second slot.

Figure 16:
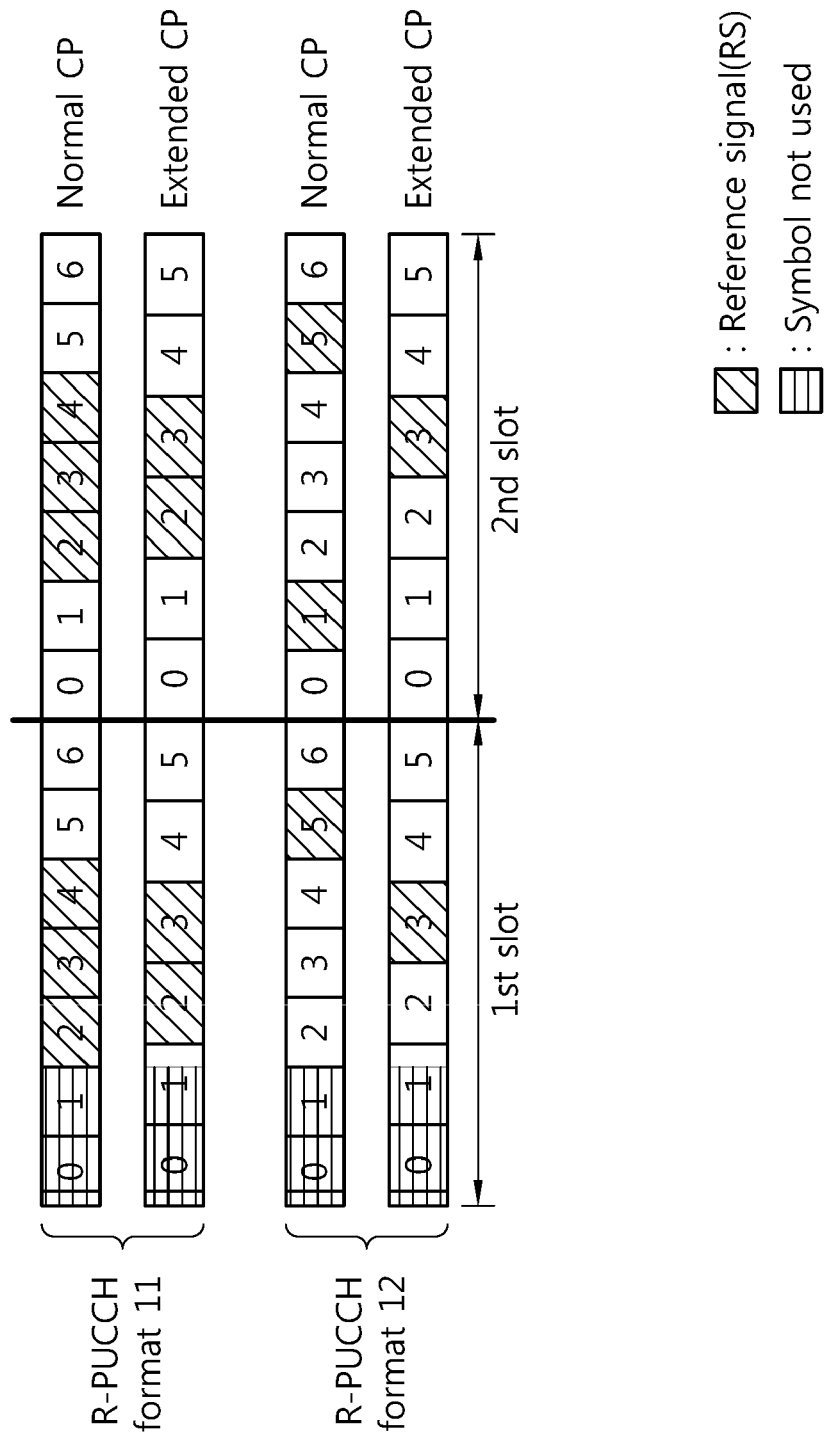
FIG. 16 is a diagram showing a sixth example of an R-PUCCH structure.

FIG. 16 is a diagram showing a sixth example of an R-PUCCH structure.

The sixth example of the R-PUCCH structure is different from the first and fourth examples of the R-PUCCH structure in symbols, other than the first two symbols of a subframe, to which a reference signal and control information are allocated and the same as the remaining portions as the first and fourth examples of the R-PUCCH structure. The first two symbols of the subframe can be used to receive a signal of a relay UE resulting from propagation delay and can be used as a guard time.

FIG. 16 illustrates the example in which the reference signal and the control information are allocated to symbols other than the first two symbols of the subframe in the first example of the R-PUCCH structure, but not limited thereto. The sixth example of the R-PUCCH structure can also be applied to the fourth example of the R-PUCCH structure in the same manner. In other words, in the fourth example of the R-PUCCH structure, the reference signal and the control information can be allocated to symbols other than the first two symbols in the same manner and transmitted.

Figure 17:
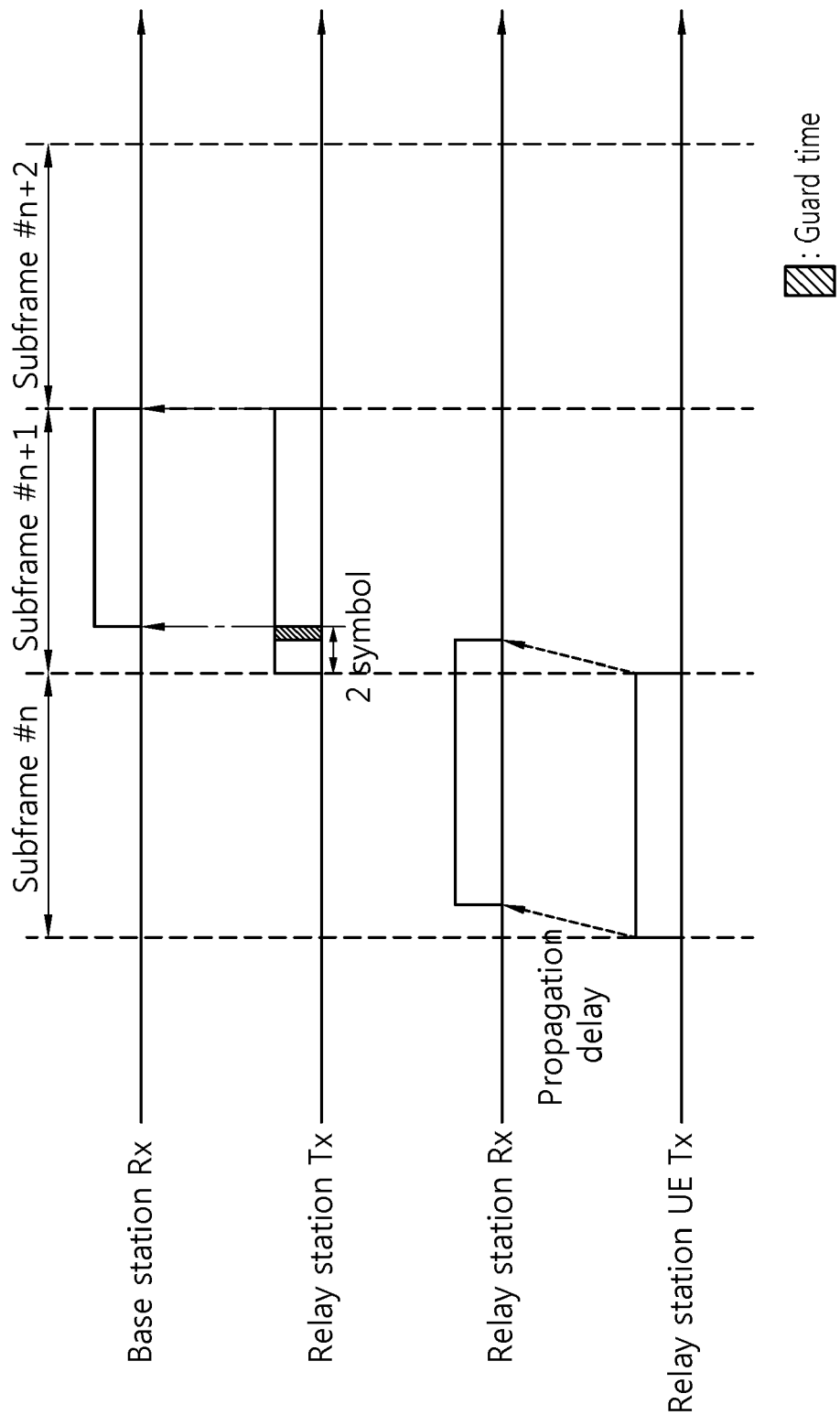
FIG. 17 is a diagram showing a timing relationship to which the sixth example of the R-PUCCH structure can be applied.

FIG. 17 is a diagram showing a timing relationship to which the sixth example of the R-PUCCH structure can be applied.

Referring to FIG. 17, an access UL signal transmitted by a relay UE in a subframe #n can be received by a relay station even in some symbols of a subframe #n+1 because of propagation delay. In this case, the relay station can receive the signal of the relay UE within the first 2 symbols of the subframe #n+1 and then transmit a backhaul UL signal to a base station after a guard time. In such a timing relationship, the relay station can use the sixth example of the R-PUCCH structure in the subframe #n+1.

Figure 18:
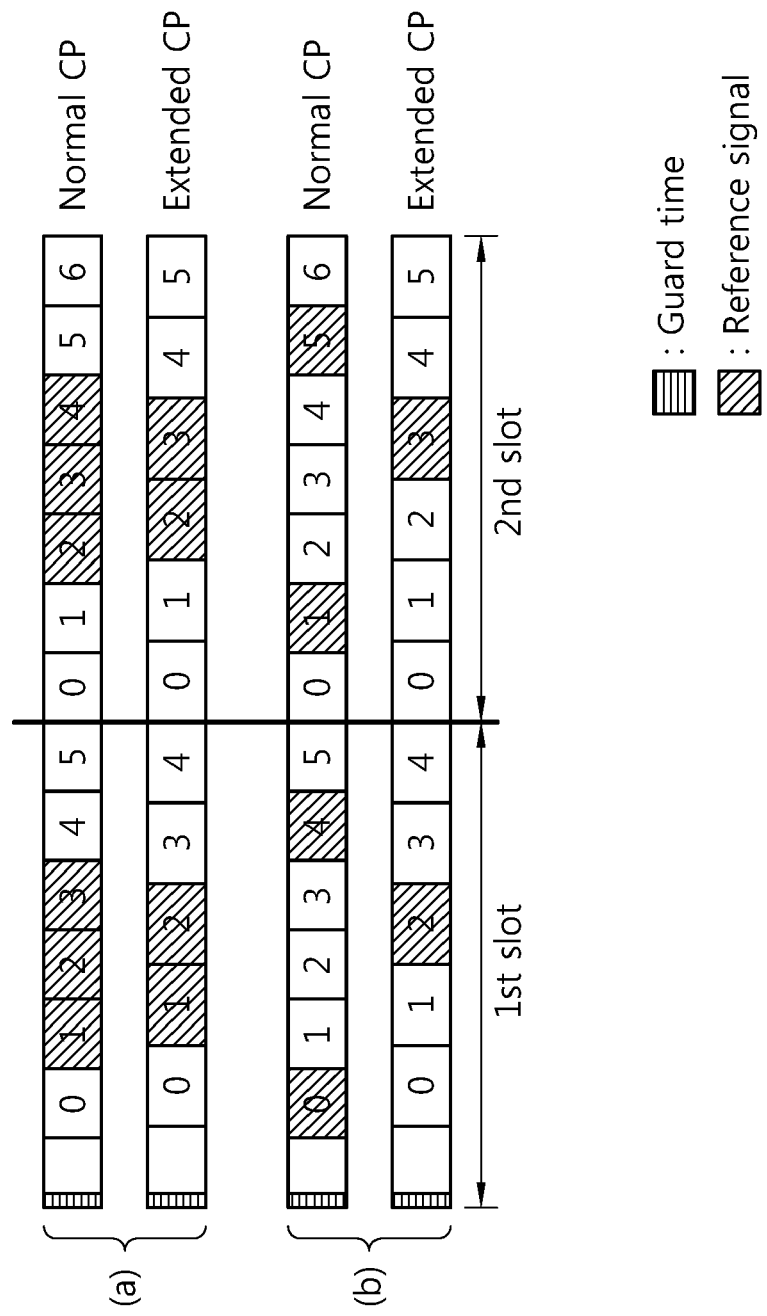
FIGS. 18 and 19 show examples of symbol indices applied to a backhaul UL subframe.
Figure 19:
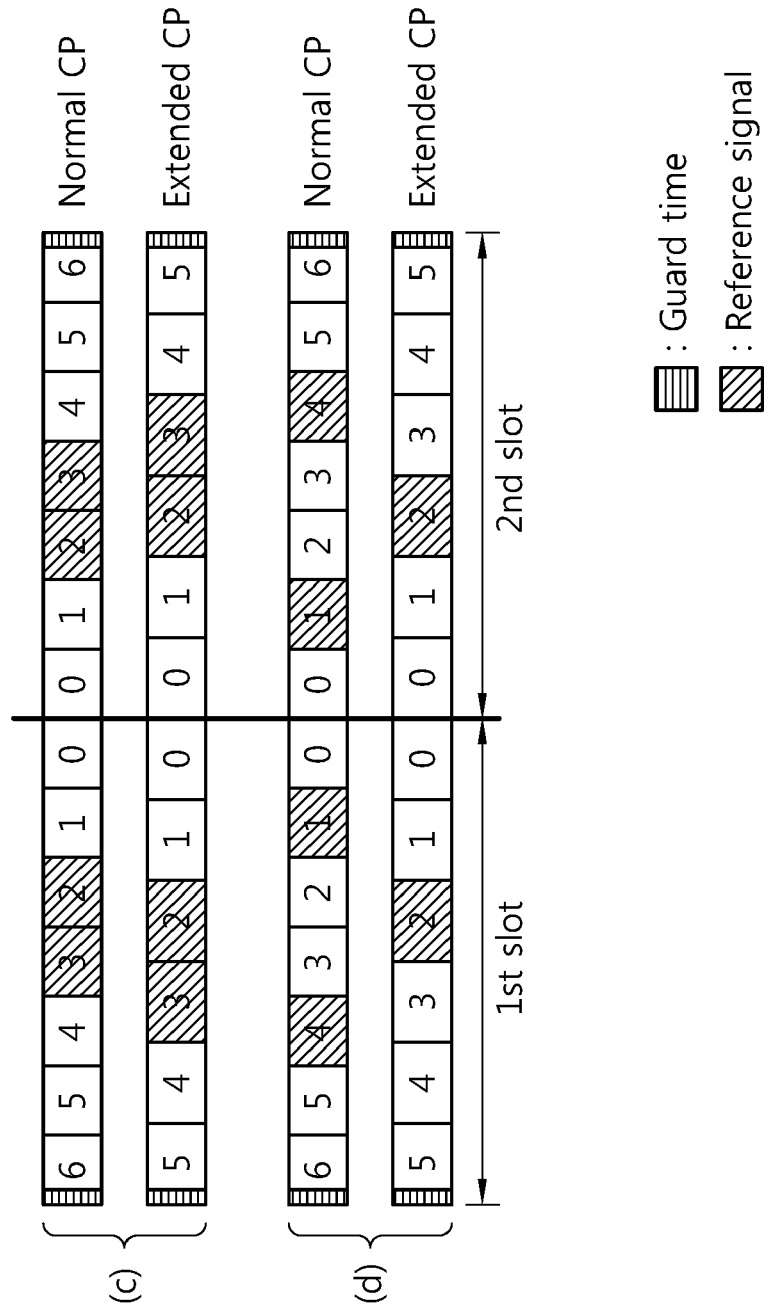

FIGS. 18 and 19 show examples of symbol indices applied to a backhaul UL subframe.

Referring to FIGS. 18(*a*) and 18(*b*), in the symbol indices of the backhaul UL subframe, the symbol indices are not allocated to the first symbol of a first slot, but first allocated to the second symbol of the first slot starting from 0 in an ascending order. The symbol indices are allocated to the first symbol of a second slot starting from 0 in an ascending order.

Referring to FIG. 19, the symbol indices of the backhaul UL subframe are symmetrically allocated around a slot boundary. For example, in the case of a normal CP subframe of FIG. 19(*c*), the symbol indices are allocated from 0 to 6, sequentially, starting from the seventh symbol of a first slot in the direction of the first symbol. Meanwhile, the symbol indices are allocated from 0 to 6, sequentially, starting from the first symbol of a second slot in the direction of the seventh symbol of the second slot. In the case in which the symbol indices are symmetrically allocated around a slot boundary, control information, a reference signal sequence, etc. which are applied according to symbol indices can be symmetrically allocated even without changing the existing rules.

Figure 20:
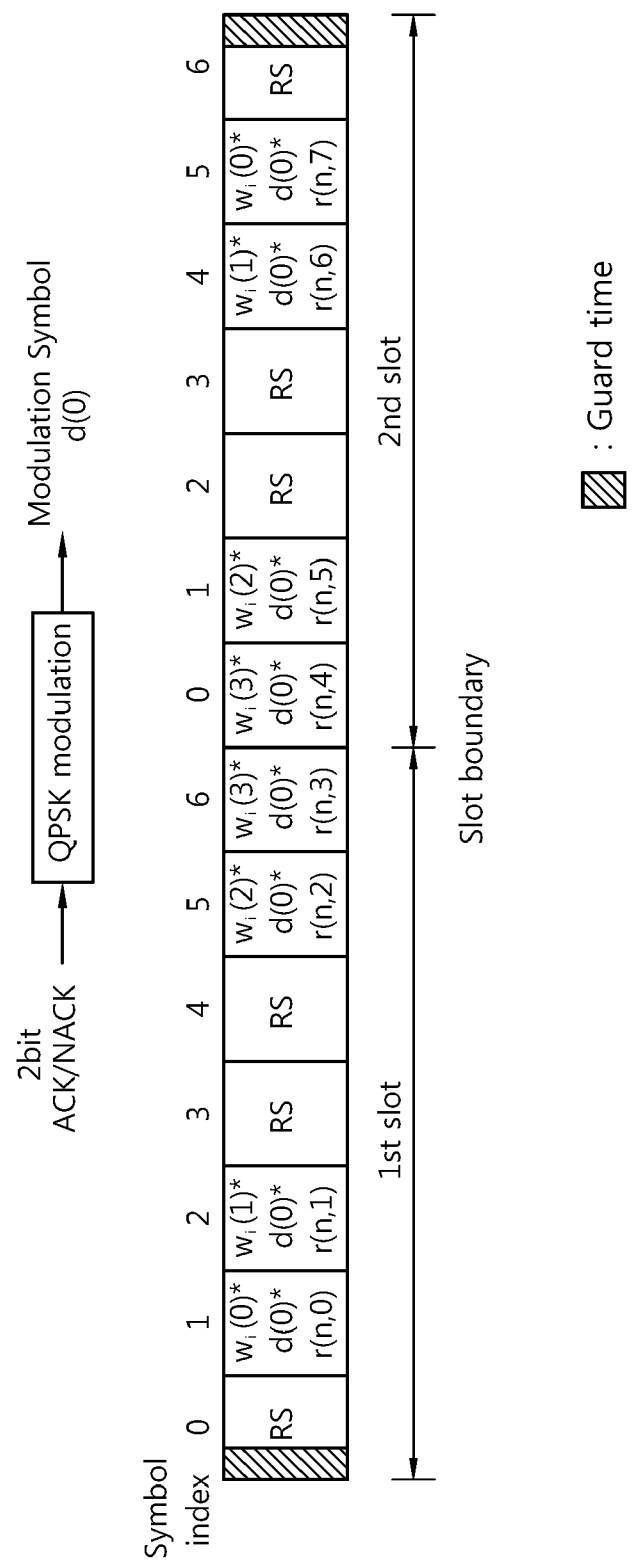
FIGS. 20 and 21 are diagrams showing an example in which an orthogonal sequence is applied to an R-PUCCH structure having a symmetrical structure.
Figure 21:
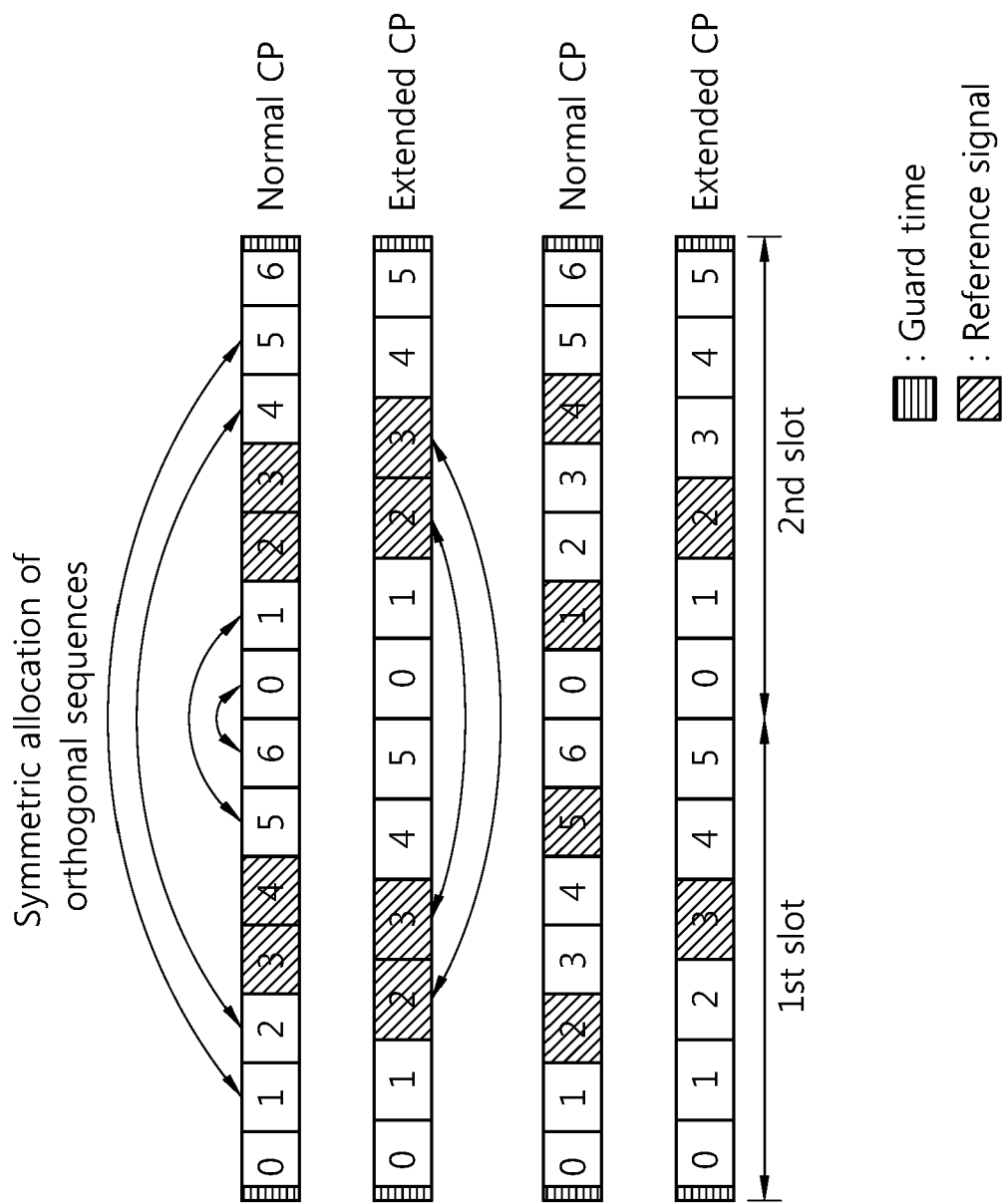

FIGS. 20 and 21 are diagrams showing an example in which an orthogonal sequence is applied to an R-PUCCH structure having a symmetrical structure.

In the case in which an R-PUCCH structure is symmetrical about a slot boundary, a payload, such as an ACK/NACK signal, is allocated to, for example, the symbols #1, 2, 5, and 6 of a first slot and the symbols #0, 1, 4, and 5 of a second slot, and an RS can be allocated to the symbols #3 and 4 of the first slot and the symbols #2 and 3 of the second slot. In such a case, in order to transmit an ACK/NACK signal, a 2-bit ACK/NACK signal is subjected to QPSK modulation, thereby generating one modulation symbol d(0). A modulated sequence m(n) generated on the basis of the modulation symbol d(0) and a cyclic-shifted sequence r(n,a) can be generated in accordance with Equation 1.

$$m(n)=d(0)r(n,a)$$ [Math. 1]

In Equation 1, the cyclic-shifted sequence r(n,a) refers to a sequence r(n) which is cyclically shifted by a. The modulated sequence m(n) can be generated by multiplying the cyclic-shifted sequence r(n,a) by a modulation symbol. The modulated sequence m(n) can be spread using an orthogonal sequence. If the orthogonal sequence is represented using $w_i(k)$ (where i is a sequence index, $0 \leq k \leq K-1$), a value symmetrical about the slot boundary is applied to the modulated sequence, as shown in FIGS. 20 and 21. For example, $w_i(3)$ can be applied to the symbol #6 of the first slot and the symbol #0 of the second slot, $w_i(2)$ can be applied to the symbol #5 of the first slot and the symbol #1 of the second slot, $w_i(1)$ can be applied to the symbol #2 of the first slot and the symbol #4 of the second slot, and $w_i(0)$ can be applied to the symbol #1 of the first slot and the symbol #5 of the second slot. In the conventional method, orthogonal sequence values are sequentially applied in each slot. In the conventional method, in the case in which the orthogonal sequence values cannot be applied to the first symbol of the first slot and the last symbol of the second slot, complexity can be increased because a different orthogonal sequence value is applied in each slot. However, in the case in which the orthogonal sequence values are symmetrically applied around a slot boundary, there is a high probability that the same orthogonal sequence value can be applied to the first slot and the second slot. Accordingly, complexity is decreased.

An orthogonal sequence applicable to an R-PUCCH structure can vary according to a spreading factor (SF). The following sequence can be used as an orthogonal sequence $w_i(k)$ (where i is a sequence index, $0 \leq k \leq K-1$) having a spreading factor K=4.

TABLE 1

| SEQUENCE INDEX | [w(0), w(1), w(2), w(3)] |
|---|---|
| 0 | [+1 +1 +1 +1] |
| 1 | [+1 −1 +1 −1] |
| 2 | [+1 −1 −1 +1] |

The following sequence can be used as an orthogonal sequence $w_i(k)$ (where i is a sequence index, $0 \leq k \leq K-1$) having a spreading factor K=3.

TABLE 2

| SEQUENCE INDEX | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The following sequence can be used as an orthogonal sequence $w_i(k)$ (where i is a sequence index, $0 \leq k \leq K-1$) having a spreading factor K=2.

TABLE 3

| SEQUENCE INDEX | [w(0), w(1)] |
|---|---|
| 0 | [1 1] |
| 1 | [1 −1] |

The following sequence can be used as an orthogonal sequence $w_i(k)$ (where i is a sequence index, $0 \leq k \leq K-1$) having a spreading factor K=1.

TABLE 4

| SEQUENCE INDEX | [w(0)] |
|---|---|
| 0 | [1] |

Figure 22:
FIGS. 22 and 23 are diagrams showing an example of an R-PUCCH structure which can be applied in the case in which boundaries between subframes are identical with each other.
Figure 23:
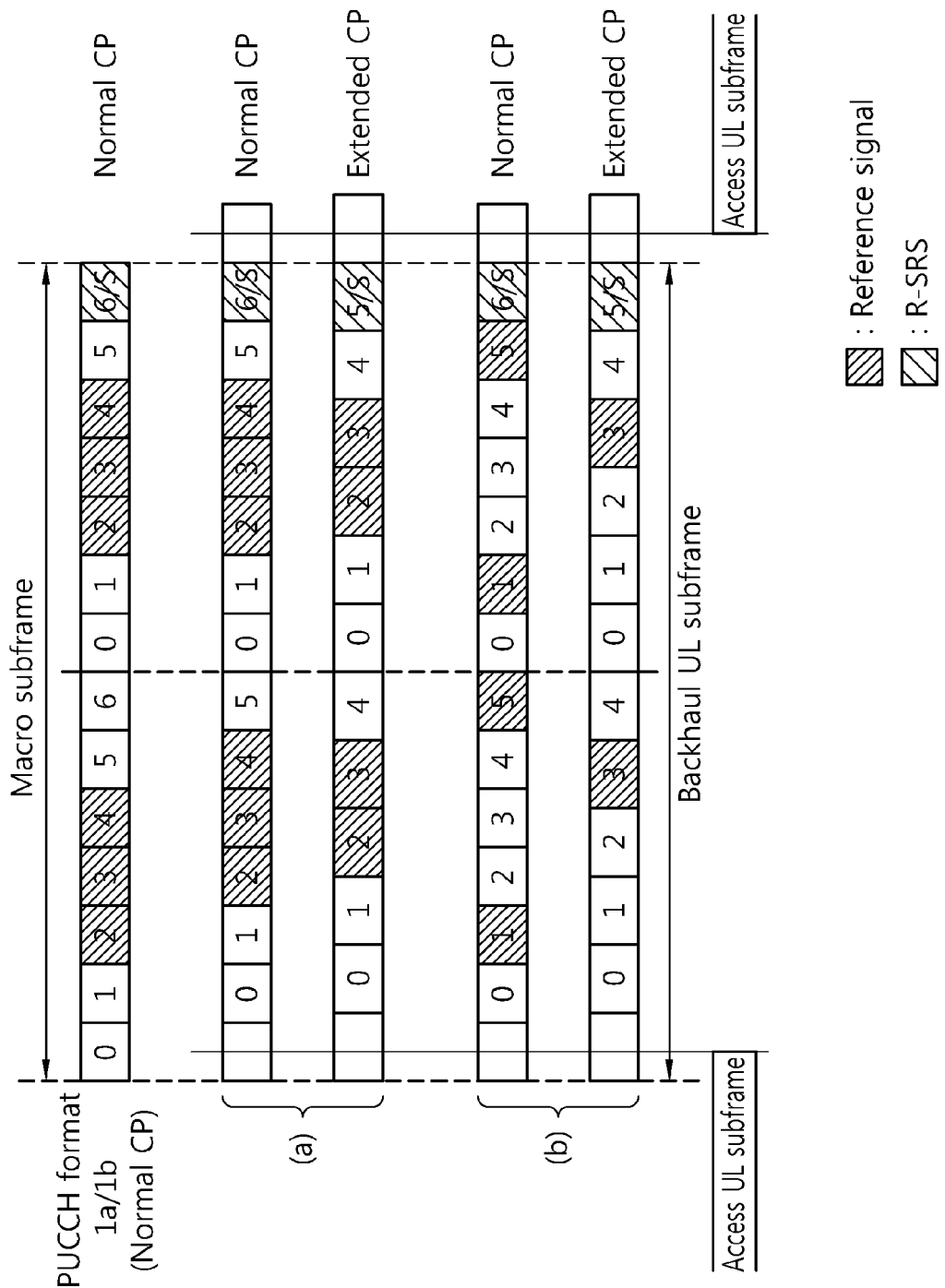

FIGS. 22 and 23 are diagrams showing an example of an R-PUCCH structure which can be applied in the case in which boundaries between subframes are not aligned with each other.

Referring to FIG. 22, the boundary of an access UL subframe transmitted from a relay UE to a relay station is not identical with the boundary of a backhaul UL subframe transmitted from the relay station to a base station. In such a case, the relay station can receive a signal from the relay UE even in some of the first symbol of the backhaul UL subframe (i.e., a symbol having a symbol index of 0). The relay station can receive a signal from the relay UE in some part of the first symbol and use the remaining part of the first symbol as a guard time. The relay station can transmit a signal to the base station using the last symbol starting from the second symbol of the backhaul UL subframe. The last symbol of the backhaul UL subframe can be used to transmit an R-SRS. Here, the R-SRS can be multiplexed with an SRS, transmitted by a macro UE, in the same symbol as the SRS. If the R-PUCCH structure is used as described above, the relay station can use 13 symbols in a normal CP and 11 symbols in an extended CP.

The R-PUCCH structure of FIG. 23 is different from that of FIG. 22 in that the symbol index of a backhaul UL subframe is not allocated to the first symbol of a first slot, but allocated starting from the second symbol of the first slot.

Figure 24:
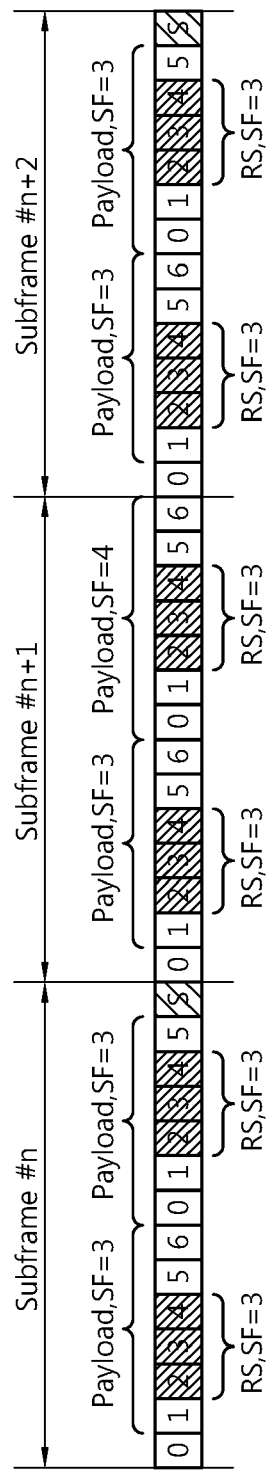
FIG. 24 is a diagram showing an example in which an R-PUCCH structure is applied in contiguous backhaul UL subframes.

FIG. 24 is a diagram showing an example in which an R-PUCCH structure is applied in contiguous backhaul UL subframes. In FIG. 24, the backhaul UL subframe is indicated by a subframe, for convenience sake.

Referring to FIG. 24, an R-SRS can be transmitted in a subframe #n and a subframe #n+2, and the R-SRS may not be transmitted in a subframe #n+1. As described above, the number of symbols which can be used by a relay station in order to transmit control information can vary depending on whether the R-SRS is transmitted in each subframe. In such a case, symbols to which control information of each slot is allocated can have different spreading factor(i.e., orthogonal sequences applied to a payload can have different spreading factor). For example, in a subframe in which an R-SRS is transmitted, such as the subframe #n and the subframe #n+2 shown in FIG. 24, an orthogonal sequence having a spreading factor of 3 can be applied to the R-PUCCH payload of a first slot and a second slot. On the other hand, in a subframe, such as the subframe #n+1 shown in FIG. 24, an orthogonal sequence having a spreading factor of 3 can be applied to the payload of a first slot, and an orthogonal sequence having a spreading factor of 4 can be applied to the payload of a second slot.

In some cases, the same R-PUCCH structure may be used in the backhaul UL subframes of all relay stations. In the case in which any one of a plurality of relay stations transmits an ACK/NACK signal to a base station, any one of the above-described R-PUCCH structures can be used. In this case, same R-PUCCH structure has to be used in the remaining relay stations. For this reason, the base station can have a signaling overload because it has to transmit configuration information about the R-PUCCH structure to the plurality of relay stations. In order to prevent this problem, one R-PUCCH structure (or format) can be previously designated in a backhaul UL subframe available to all the relay stations so that the R-PUCCH structure can be used.

Alternatively, the base station can previously set a period in which an R-SRS can be transmitted or a set of periods so that the R-SRS can be transmitted only in a specific backhaul UL subframe. Here, the base station may previously set a specific R-PUCCH structure so that the R-PUCCH structure can be used only in a backhaul UL subframe in which the R-SRS is transmitted.

Hereinafter, the structure of a subframe is described in the case in which a relay UE and a relay station transmit and receive a signal by a slot unit not a subframe unit. The subframe structure to be described later can be selectively applied to some of backhaul UL subframes.

Figure 25:
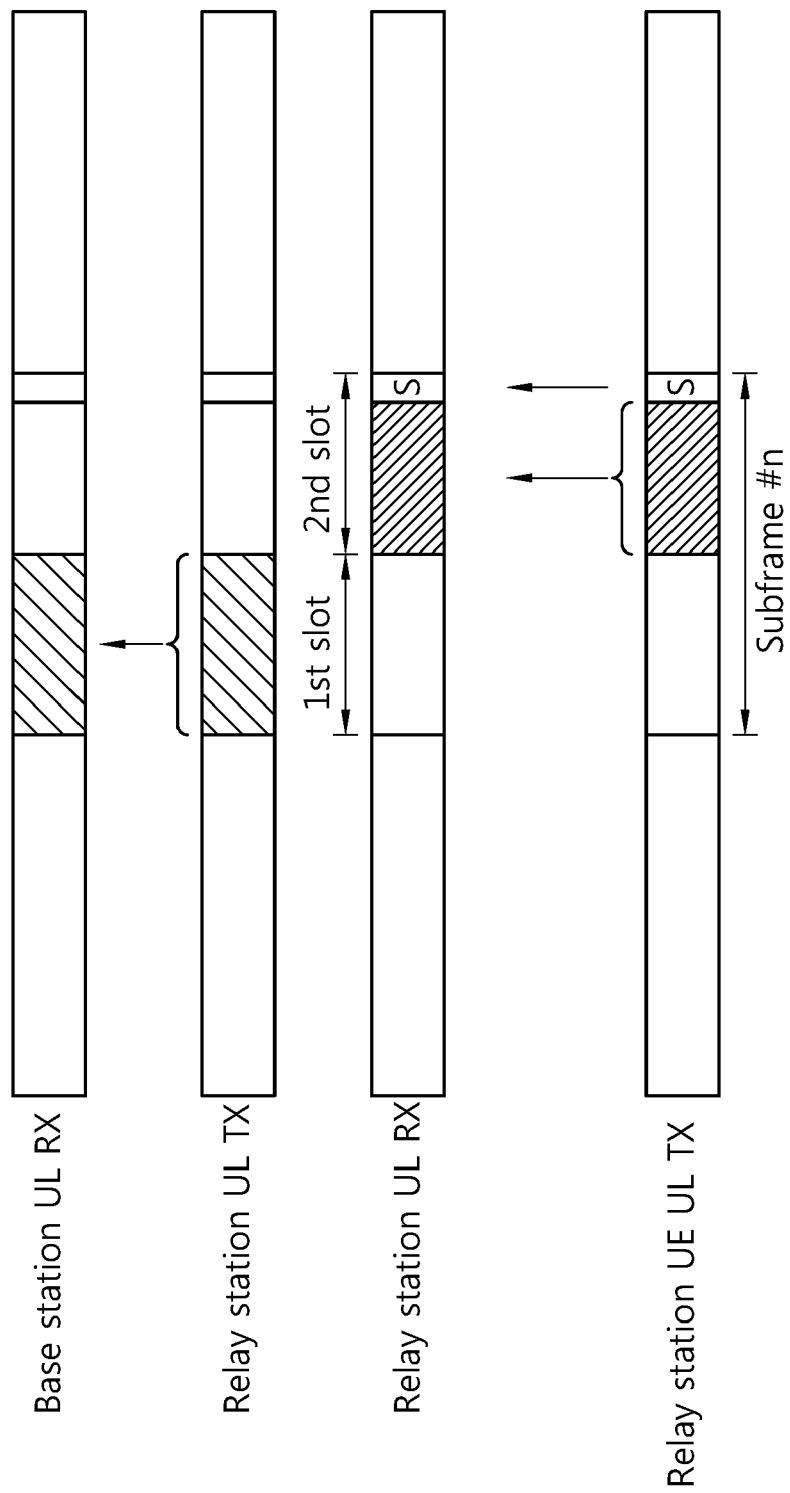
FIG. 25 is a diagram showing a subframe structure in the case in which a R-UE transmits an SRS to a relay station.

FIG. 25 is a diagram showing a subframe structure in the case in which a relay UE transmits an SRS to a relay station.

The subframe structure of FIG. 25 is possible in the case in which a relay UE can transmit an SRS to a relay station in a subframe #n. In this case, the relay UE is compatible with the existing LTE standards when it transmits the SRS in the last symbol of the subframe #n. Accordingly, it is preferred that the relay UE transmit a signal in the unit of a slot not in the first slot of the subframe #n, but in the second slot of the subframe #n. Further, the relay station can transmit a backhaul UL signal to a base station in the first slot of the subframe #n. Accordingly, a guard time is needed only once in the subframe #n. The above subframe structure can be used in the case in which a relay station has to receive an access UL signal and an SRS from a relay UE in a specific subframe.

Figure 26:
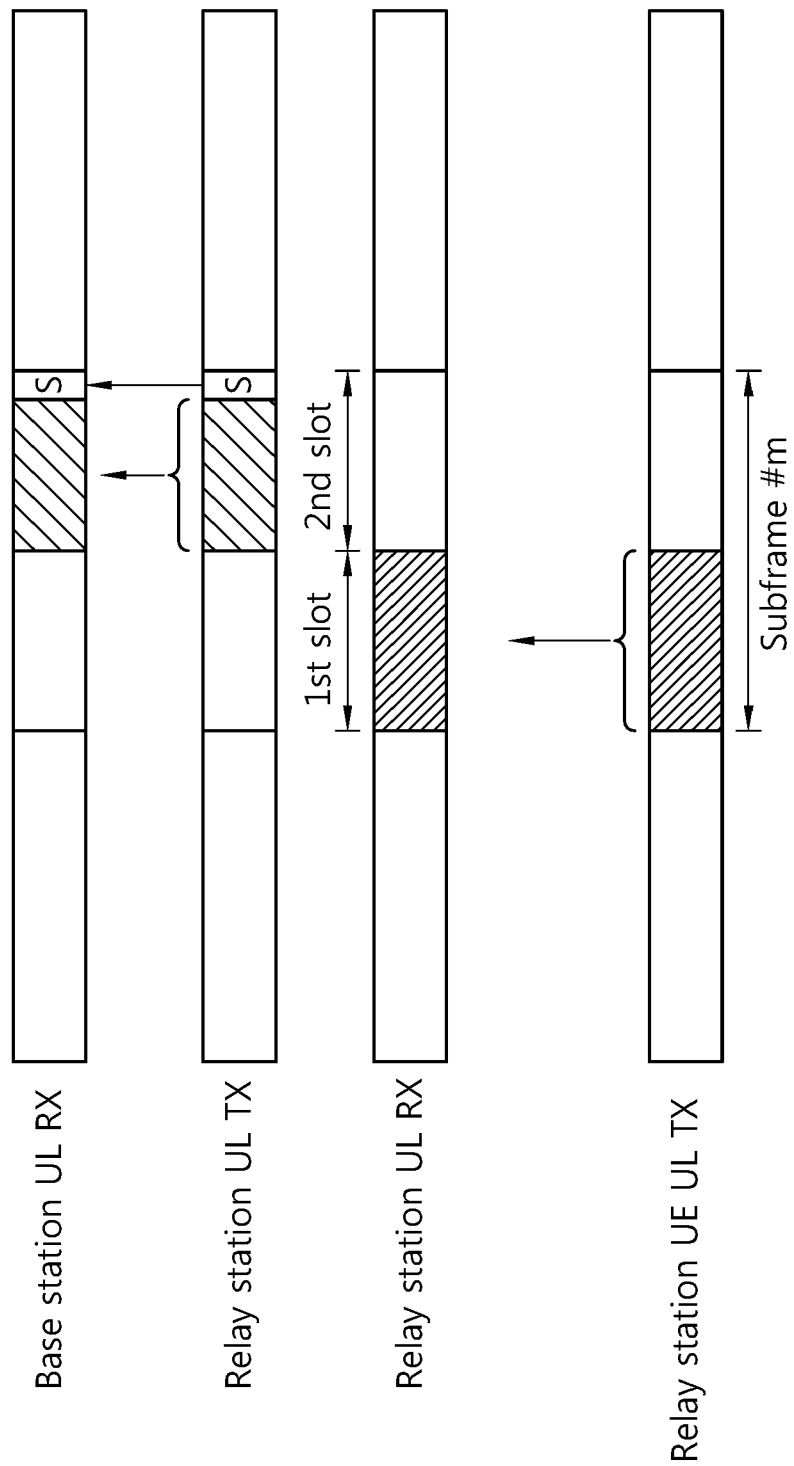
FIG. 26 is a diagram showing a subframe structure in the case in which a relay station transmits an R-SRS to a base station.

FIG. 26 is a diagram showing a subframe structure in the case in which a relay station transmits an R-SRS to a base station.

The subframe structure of FIG. 26 is possible in the case in which a relay station can transmit an R-SRS to a base station in a subframe #m. Accordingly, the relay station can transmit a backhaul UL signal and an R-SRS in the second slot of the subframe #m. The relay UE can transmit an access UL signal to the relay station in the first slot of the subframe #m. The above subframe structure can be used in the case in which a base station has to receive an R-PUCCH, an R-PUSCH, and an R-SRS in a specific subframe.

Figure 27:
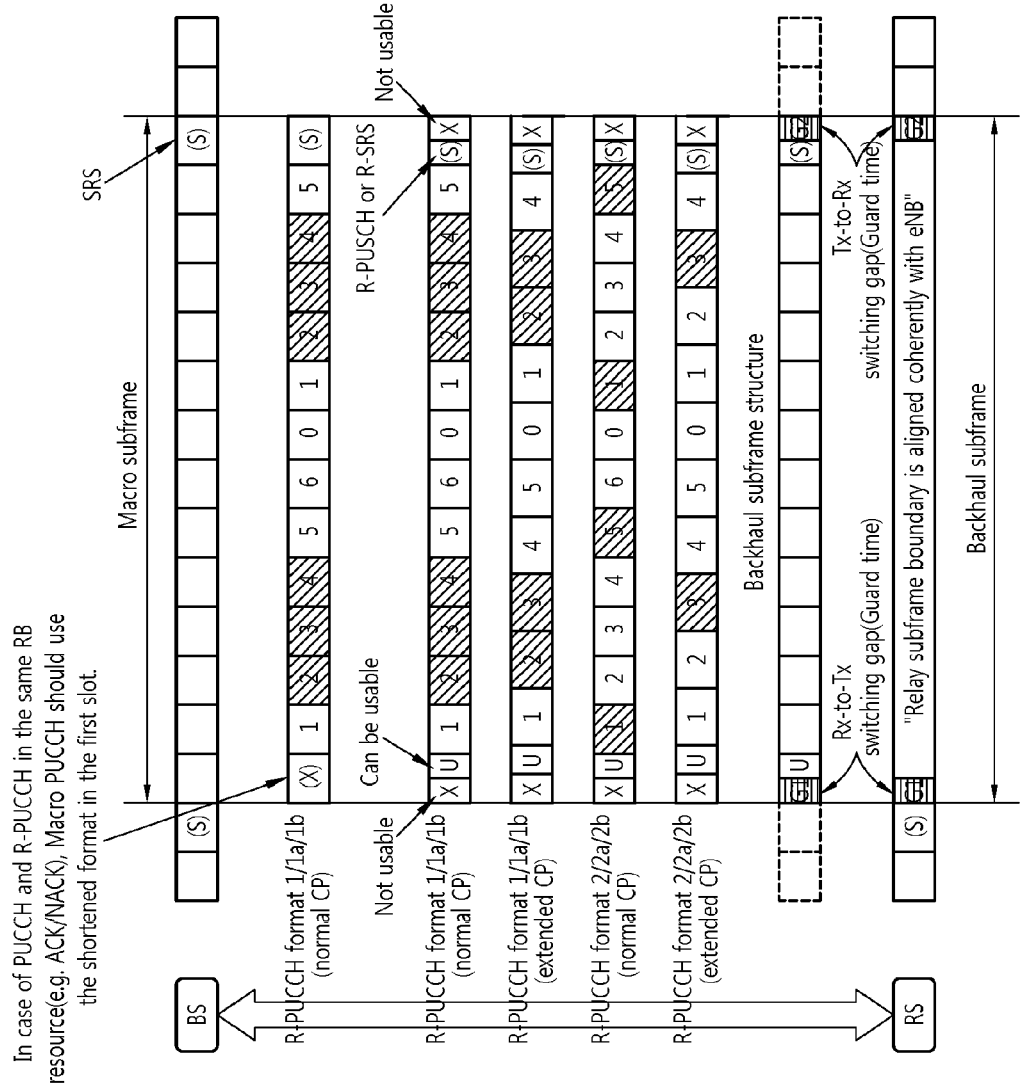
FIG. 27 is a diagram showing an example of the structure of PUCCHs and the structure of R-PUCCHs in the case in which the PUCCH of a macro UE and the R-PUCCH of a relay station are multiplexed within the same resource block.

FIG. 27 is a diagram showing an example of the structure of PUCCHs and the structure of R-PUCCHs in the case in which the PUCCH of a macro UE and the R-PUCCH of a relay station are multiplexed within the same resource block.

The R-PUCCH structure is a shortened format in which the number of available symbols has been shortened. That is, in the first to sixth examples of the above-described R-PUCCH structures, some of a backhaul UL subframe (e.g., the first symbol of a first slot) is not used. Accordingly, in the case in which a PUCCH and an R-PUCCH are multiplexed within the same resource block, the PUCCH structure can be used when it uses a shortened format like the R-PUCCH structure. Referring to a PUCCH format 1/1a/1b for a normal CP in FIG. 27, in the case in which a PUCCH and an R-PUCCH are multiplexed in the same resource block, a first symbol is not used.

In FIG. 27, an R-PUCCH structure indicated by an R-PUCCH format 2/2a/2b can be used, for example, by a relay station in order to transmit a CQI to a base station. In the case of the R-PUCCH format 2/2a/2b, the last symbol of a subframe is not used. Further, an R-SRS can be transmitted in a ½ symbol. Accordingly, in the case of the R-PUCCH format 2/2a/2b, collision does not occur although an R-SRS and a CQI are transmitted at the same time within the same subframe. In the case of a macro UE, in the case in which the transmission of a CQI and the transmission of an SRS are scheduled to be performed in the same subframe, the transmission of the CQI is dropped. Meanwhile, a relay station can transmit an R-SRS and a CQI at the same time in the same subframe. The relay station can use some of the last symbol to transmit data (i.e., an R-PUSCH) in subframes in which the R-SRS is not transmitted. In some cases, the relay station may combine partial symbol of the last symbol and the first symbol of a subframe or independently use them to transmit data.

Figure 28:
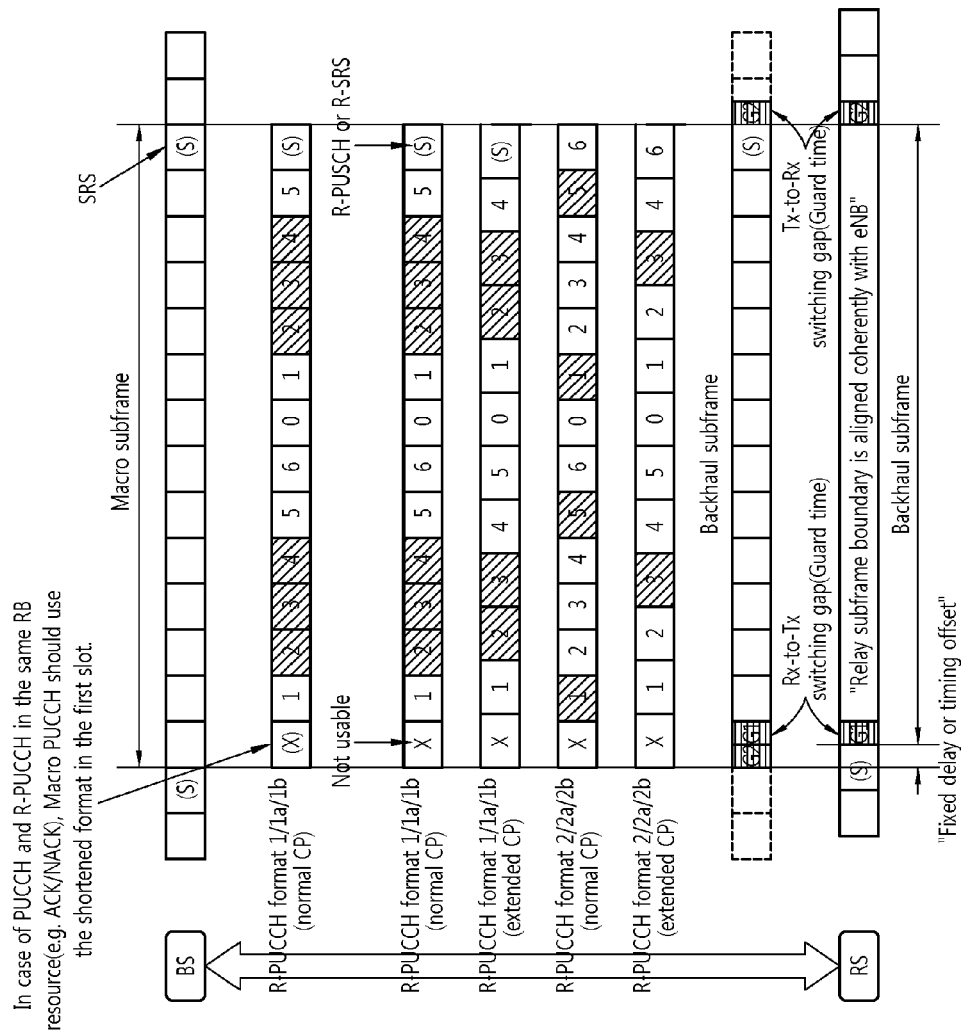
FIG. 28 is a diagram showing another example of the structure of PUCCHs and the structure of R-PUCCHs in the case in which the PUCCH of a macro UE and the R-PUCCH of a relay station are multiplexed within the same resource block.

FIG. 28 is a diagram showing another example of the structure of PUCCHs and the structure of R-PUCCHs in the case in which the PUCCH of a macro UE and the R-PUCCH of a relay station are multiplexed within the same resource block.

The structures of FIG. 28 are different from those of FIG. 27 in that a backhaul UL subframe and an access UL subframe are not aligned with the subframe of a base station (i.e., a macro subframe). In the case in which a PUCCH and an R-PUCCH are multiplexed within the same resource block as in FIG. 27, a PUCCH structure can be used when it uses a shortened format like an R-PUCCH structure. That is, the first symbol of a subframe is not used, but a shortened format is used in the first slot.

A backhaul UL subframe is deviated from a base station subframe by a fixed value or a predetermined time offset value. A total of 13 symbols can be used in the case of a normal CP, and a total of 11 symbols can be used in the case of an extended CP. A relay station can transmit an R-SRS in the last symbol of a backhaul UL subframe and can transmit an R-PUSCH in the last symbol of the backhaul UL subframe when the R-SRS is not transmitted.

Figure 29:
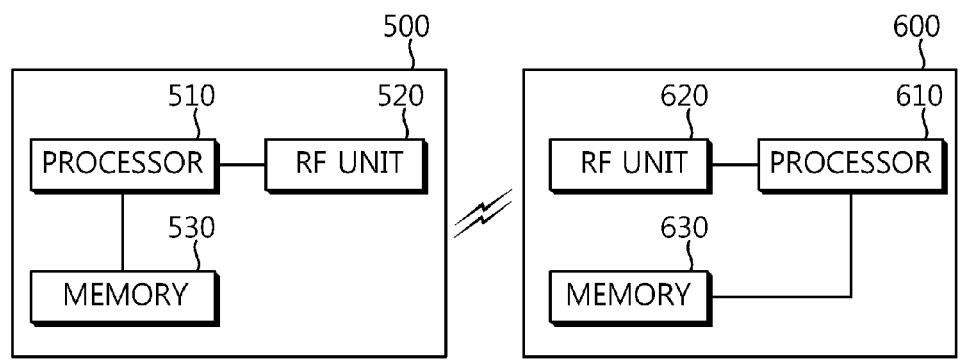
FIG. 29 is a block diagram showing a wireless communication system in which embodiments of the present invention are implemented.

FIG. 29 is a block diagram showing a wireless communication system in which the embodiments of the present invention are implemented.

A base station 500 includes a processor, 510, memory, 530, and a Radio Frequency (RF) unit 520. The processor 510 allocates radio resources to a relay station and performs scheduling for receiving a signal from the relay station. Procedures, schemes, and functions performed by the base station in the above embodiments can be implemented by the processor 510. The memory 530 is connected to the processor 510 and configured to various pieces of information for driving the processor 510. The RF unit 520 is connected to the processor 510 and configured to transmit and receive a radio signal.

A relay station 600 includes a processor 610, an RF unit 620, and memory 630. The processor 610 transmits R-PUCCHs and R-PUSCHs through radio resources allocated thereto. Procedures, schemes, and functions performed by the relay station in the above embodiments can be implemented by the processor 610. That is, the processor 610 receives information about the structure of a subframe from a base station, allocates a reference signal and control information to a backhaul UL subframe on the basis of the information, and transmits the reference signal and the control information to the base station. The RF unit 620 is connected to the processor 610 and configured to transmit and receive a radio signal. The memory 630 is connected to the processor 610 and configured to store various pieces of information for driving the processor 610.

The processor 510, 610 can include an Application-Specific Integrated Circuit (ASIC), other chipset, a logic circuit, and a data processor. The RF unit 520, 620 can include a baseband circuit for processing a radio signal. The memory 530, 630 can include Read-Only Memory (ROM), Random Access Memory (RAM), flash memory, a memory card, a storage medium and/or other storage devices. When the embodiment is implemented in software, the above scheme can be implemented by a module (or a process or a function) to perform the above functions. The module can be stored in the memory 530, 630 and executed by the processor 510, 610. The memory 530, 630 can be disposed inside or outside the processor 510, 610 and connected to the processor 510, 610 using a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of a relay station transmitting a backhaul uplink (UL) signal, the method comprising:
   receiving information about a structure of a subframe from a base station,
   wherein the received information indicates a first subframe structure or a second subframe structure;
   allocating a demodulation reference signal (DM-RS), a relay-sounding reference signal (R-SRS) and control information to a backhaul UL subframe on a basis of the received information; and
   transmitting the DM-RS, the R-SRS and the control information,
   wherein the DM-RS and the control information are allocated to symbols other than a first symbol and last 2 symbols of the backhaul UL subframe,
   wherein when the received information indicates the first subframe structure, the R-SRS is allocated to a second-to-last symbol of the backhaul UL subframe and a sounding reference signal (SRS) is allocated to a last symbol of the backhaul UL subframe, the SRS being a reference signal to be transmitted by a user equipment (UE), and wherein when the received information indicates the second subframe structure, both the R-SRS and the SRS are allocated to a last symbol of the backhaul UL subframe, and the R-SRS and the SRS are mapped to different subcarriers.

2. The method of claim 1, wherein the DM-RS is a reference signal used for a demodulation of the control information and the R-SRS is a reference signal used for uplink scheduling.

3. The method of claim 1, wherein the R-SRS is mapped to an odd-numbered subcarrier and the SRS is mapped to an even-numbered subcarrier.

4. The method of claim 1, wherein:
the backhaul UL subframe includes two slots, and each of the slots includes a plurality of symbols.

5. The method of claim 4, wherein:
in a case in which each of the two slots includes 7 symbols and indices of the symbols are sequentially given 0 to 6, respectively, the DM-RS is allocated to a symbol having the symbol index of 2, 3, or 4 in each of the two slots, and the control information is allocated to a symbol having the symbol index of 1, 5, or 6 in the first slot and a symbol having the symbol index of 0 or 1 in the second slot, and in a case in which each of the two slots includes 6 symbols and indices of the symbols are sequentially given 0 to 5, respectively, the DM-RS is allocated to a symbol having the symbol index of 2 or 3 in each of the two slots, and the control information is allocated to a symbol having the symbol index of 1, 4, or 5 in the first slot and a symbol having the symbol index of 0 or 1 in the second slot.

6. The method of claim 4, wherein:
in a case in which each of the two slots includes 7 symbols and indices of the symbols are sequentially given 0 to 6, respectively, the DM-RS is allocated to a symbol having the symbol index of 1 or 5 in the first slot and a symbol having the symbol index of 1 in the second slot, and the control information is allocated to a symbol having the symbol index of 2, 3, 4, or 6 in the first slot and a symbol having the symbol index of 0, 2, 3, or 4 in the second slot, and in a case in which each of the two slots includes 6 symbols and indices of the symbols are sequentially given 0 to 5, respectively, the DM-RS is allocated to a symbol having the symbol index of 3 in each of the two slots, and the control information is allocated to a symbol having the symbol index of 1, 2, 4, or 5 in the first slot and a symbol having the symbol index of 0, 1, or 2 in the second slot.

7. The method of claim 4, wherein:
in a case in which each of the two slots includes 7 symbols and indices of the symbols are sequentially given 0 to 6, respectively, the DM-RS is allocated to a symbol having the symbol index of 2, 3, or 4 in the first slot and a symbol having the symbol index of 2 or 3 in the second slot, and the control information is allocated to a symbol having the symbol index of 1, 5, or 6 in the first slot and a symbol having the symbol index of 0, 1 or 4 in the second slot, and in a case in which each of the two slots includes 6 symbols and indices of the symbols are sequentially given 0 to 5, respectively, the DM-RS is allocated to a symbol having the symbol index of 2 or 3 in the first slot and a symbol having the symbol index of 2 in the second slot, and the control information is allocated to a symbol having the symbol index of 1, 4, or 5 in the first slot and a symbol having the symbol index of 0, 1, or 3 in the second slot.

8. The method of claim 4, wherein:
in a case in which each of the two slots includes 7 symbols and indices of the symbols are sequentially given 0 to 6, respectively, the DM-RS is allocated to a symbol having the symbol index of 1 or 5 in the first slot and a symbol having the symbol index of 1 or 3 in the second slot, and the control information is allocated to a symbol having the symbol index of 2, 3, 4, or 6 in the first slot and a symbol having the symbol index of 0, 2, or 4 in the second slot, and in a case in which each of the two slots includes 6 symbols and indices of the symbols are sequentially given 0 to 5, respectively, the DM-RS is allocated to a symbol having the symbol index of 3 in the first slot and a symbol having the symbol index of 2 in the second slot, and the control information is allocated to a symbol having the symbol index of 1, 2, 4, or 5 in the first slot and a symbol having the symbol index of 0, 1, or 3 in the second slot.

9. The method of claim 4, wherein:
in a case in which each of the two slots includes 7 symbols and indices of the symbols are sequentially given 0 to 6, respectively, the DM-RS is allocated to a symbol having the symbol index of 3 or 4 in the first slot and a symbol having the symbol index of 2 or 3 in the second slot, and the control information is allocated to a symbol having the symbol index of 1, 2, 5, or 6 in the first slot and a symbol having the symbol index of 0, 1, or 4 in the second slot, and in a case in which each of the two slots includes 6 symbols and indices of the symbols are sequentially given 0 to 5, respectively, the DM-RS is allocated to a symbol having the symbol index of 2 or 3 in each of the slots, and the control information is allocated to a symbol having the symbol index of 1, 4, or 5 in the first slot and a symbol having the symbol index of 0 or 1 in the second slot.

10. The method of claim 4, wherein:
in a case in which each of the two slots includes 7 symbols and indices of the symbols are sequentially given 0 to 6, respectively, the DM-RS is allocated to a symbol having the symbol index of 2 or 5 in the first slot and a symbol having the symbol index of 1 or 4 in the second slot, and the control information is allocated to a symbol having the symbol index of 1, 3, 4, or 6 in the first slot and a symbol having the symbol index of 0, 2, or 3 in the second slot, and in a case in which each of the two slots includes 6 symbols and indices of the symbols are sequentially given 0 to 5, respectively, the DM-RS is allocated to a symbol having the symbol index of 3 in the first slot and a symbol having the symbol index of 2 in the second slot, and the control information is allocated to a symbol having the symbol index of 1, 2, 4, or 5 in the first slot and a symbol having the symbol index of 0, 1, or 3 in the second slot.

11. A relay station, comprising:
a radio frequency (RF) unit configured to transmit and receive a radio signal; and
a processor connected to the RF unit,
wherein the processor is configured for:
receiving information about a structure of a subframe from a base station, wherein the received information indicates a first subframe structure or a second subframe structure;
allocating a demodulation reference signal (DM-RS), a relay-sounding reference signal (R-SRS) and control information to a backhaul UL subframe on a basis of the received information; and transmitting the DM-RS, the R-SRS and the control information, wherein the DM-RS and the control information are allocated to symbols other than a first symbol and last 2 symbols of the backhaul UL subframe, wherein when the received information indicates the first subframe structure, the R-SRS is allocated to a second-to-last symbol of the backhaul UL subframe and a sounding reference signal (SRS) is allocated to a last symbol of the backhaul UL subframe, the SRS being a reference signal to be transmitted by a user equipment (UE), and wherein when the received information indicates the second subframe structure, both the R-SRS and the SRS are allocated to a last symbol of the backhaul UL subframe and the R-SRS and the SRS are mapped to different subcarriers.

12. The relay station of claim 11, wherein the R-SRS is mapped to an odd-numbered subcarrier and the SRS is mapped to an even-numbered subcarrier.

13. The relay station of claim 11, wherein the DM-RS is a reference signal used for a demodulation of the control information and the R-SRS is a reference signal used for uplink scheduling.

14. The relay station of claim 11, wherein:
the backhaul UL subframe includes two slots, and each of the slots includes a plurality of symbols.

15. The relay station of claim 14, wherein:
in a case in which each of the two slots includes 7 symbols and indices of the symbols are sequentially given 0 to 6, respectively, the DM-RS is allocated to a symbol having the symbol index of 2, 3, or 4 in each of the two slots, and the control information is allocated to a symbol having the symbol index of 1, 5, or 6 in the first slot and a symbol having the symbol index of 0 or 1 in the second slot, and in a case in which each of the two slots includes 6 symbols and indices of the symbols are sequentially given 0 to 5, respectively, the DM-RS is allocated to a symbol having the symbol index of 2 or 3 in each of the two slots, and the control information is allocated to a symbol having the symbol index of 1, 4, or 5 in the first slot and a symbol having the symbol index of 0 or 1 in the second slot.

16. The relay station of claim 14, wherein:
in a case in which each of the two slots includes 7 symbols and indices of the symbols are sequentially given 0 to 6, respectively, the DM-RS is allocated to a symbol having the symbol index of 1 or 5 in the first slot and a symbol having the symbol index of 1 in the second slot, and the control information is allocated to a symbol having the symbol index of 2, 3, 4, or 6 in the first slot and a symbol having the symbol index of 0, 2, 3, or 4 in the second slot, and in a case in which each of the two slots includes 6 symbols and indices of the symbols are sequentially given 0 to 5, respectively, the DM-RS is allocated to a symbol having the symbol index of 3 in each of the two slots, and the control information is allocated to a symbol having the symbol index of 1, 2, 4, or 5 in the first slot and a symbol having the symbol index of 0, 1, or 2 in the second slot.

17. The relay station of claim 14, wherein:
in a case in which each of the two slots includes 7 symbols and indices of the symbols are sequentially given 0 to 6, respectively, the DM-RS is allocated to a symbol having the symbol index of 2, 3, or 4 in the first slot and a symbol having the symbol index of 2 or 3 in the second slot, and the control information is allocated to a symbol having the symbol index of 1, 5, or 6 in the first slot and a symbol having the symbol index of 0, 1 or 4 in the second slot, and in a case in which each of the two slots includes 6 symbols and indices of the symbols are sequentially given 0 to 5, respectively, the DM-RS is allocated to a symbol having the symbol index of 2 or 3 in the first slot and a symbol having the symbol index of 2 in the second slot, and the control information is allocated to a symbol having the symbol index of 1, 4, or 5 in the first slot and a symbol having the symbol index of 0, 1, or 3 in the second slot.

18. The relay station of claim 14, wherein:
in a case in which each of the two slots includes 7 symbols and indices of the symbols are sequentially given 0 to 6, respectively, the DM-RS is allocated to a symbol having the symbol index of 1 or 5 in the first slot and a symbol having the symbol index of 1 or 3 in the second slot, and the control information is allocated to a symbol having the symbol index of 2, 3, 4, or 6 in the first slot and a symbol having the symbol index of 0, 2, or 4 in the second slot, and in a case in which each of the two slots includes 6 symbols and indices of the symbols are sequentially given 0 to 5, respectively, the DM-RS is allocated to a symbol having the symbol index of 3 in the first slot and a symbol having the symbol index of 2 in the second slot, and the control information is allocated to a symbol having the symbol index of 1, 2, 4, or 5 in the first slot and a symbol having the symbol index of 0, 1, or 3 in the second slot.

19. The relay station of claim 14, wherein:
in a case in which each of the two slots includes 7 symbols and indices of the symbols are sequentially given 0 to 6, respectively, the DM-RS is allocated to a symbol having the symbol index of 3 or 4 in the first slot and a symbol having the symbol index of 2 or 3 in the second slot, and the control information is allocated to a symbol having the symbol index of 1, 2, 5, or 6 in the first slot and a symbol having the symbol index of 0, 1, or 4 in the second slot, and in a case in which each of the two slots includes 6 symbols and indices of the symbols are sequentially given 0 to 5, respectively, the DM-RS is allocated to a symbol having the symbol index of 2 or 3 in each of the slots, and the control information is allocated to a symbol having the symbol index of 1, 4, or 5 in the first slot and a symbol having the symbol index of 0 or 1 in the second slot.

20. The relay station of claim 14, wherein:
in a case in which each of the two slots includes 7 symbols and indices of the symbols are sequentially given 0 to 6, respectively, the DM-RS is allocated to a symbol having the symbol index of 2 or 5 in the first slot and a symbol having the symbol index of 1 or 4 in the second slot, and the control information is allocated to a symbol having the symbol index of 1, 3, 4, or 6 in the first slot and a symbol having the symbol index of 0, 2, or 3 in the second slot, and in a case in which each of the two slots includes 6 symbols and indices of the symbols are sequentially given 0 to 5, respectively, the DM-RS is allocated to a symbol having the symbol index of 3 in the first slot and a symbol having the symbol index of 2 in the second slot, and the control information is allocated to a symbol having the symbol index of 1, 2, 4, or 5 in the first slot and a symbol having the symbol index of 0, 1, or 3 in the second slot.

* * * * *